US011997548B2

(12) United States Patent
Shah et al.

(10) Patent No.: US 11,997,548 B2
(45) Date of Patent: *May 28, 2024

(54) USER EQUIPMENT AND BASE STATION PARTICIPATING IN PACKET DUPLICATION DURING HANDOVER FOR NR

(71) Applicant: Panasonic Intellectual Property Corporation of America, Torrance, CA (US)

(72) Inventors: Rikin Shah, Langen (DE); Ming-Hung Tao, Langen (DE); Alexander Golitschek Edler Von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 17/321,190

(22) Filed: May 14, 2021

(65) Prior Publication Data

US 2021/0274401 A1    Sep. 2, 2021

Related U.S. Application Data

(63) Continuation of application No. 16/621,004, filed as application No. PCT/EP2018/063551 on May 23, 2018, now Pat. No. 11,057,801.

(30) Foreign Application Priority Data

Jun. 26, 2017  (EP) ..................................... 17177942

(51) Int. Cl.
*H04W 36/00*  (2009.01)
*H04W 36/08*  (2009.01)
(Continued)

(52) U.S. Cl.
CPC ... *H04W 36/0069* (2018.08); *H04W 36/0058* (2018.08); *H04W 36/0066* (2013.01);
(Continued)

(58) Field of Classification Search
None
See application file for complete search history.

(56) References Cited

U.S. PATENT DOCUMENTS 11,140,571 B2 * 10/2021 Baek ..................... H04W 80/02
11,343,671 B2 *  5/2022 Du ......................... H04W 28/04
(Continued)

FOREIGN PATENT DOCUMENTS

WO    2016/163544 A1    10/2016

OTHER PUBLICATIONS

English translation of Japanese Office Action, dated Feb. 15, 2022, for Japanese Application No. 2019-571462, 5 pages.
(Continued)

*Primary Examiner* — Otis L Thompson, Jr.
(74) *Attorney, Agent, or Firm* — Seed IP Law Group LLP

(57) ABSTRACT

The present disclosure relates to a source base station. The source base station comprises a processing circuitry that generates a user equipment packet duplication status. The user equipment packet duplication status includes information on the status of uplink packet duplication performed by a user equipment with the source base station and at least one further base station. The information on the status of uplink packet duplication is per uplink radio bearer, one or more uplink radio bearers being established between the user equipment and the source base station. The source base station further comprises a transmitter that transmits the user equipment packet duplication status to a target base station which is the target of a handover from the source base station performed for the user equipment.

15 Claims, 14 Drawing Sheets

(51) Int. Cl.
  *H04W 36/22* (2009.01)
  *H04W 74/0833* (2024.01)
  *H04W 80/08* (2009.01)
(52) U.S. Cl.
  CPC ........... *H04W 36/08* (2013.01); *H04W 36/22* (2013.01); *H04W 74/0833* (2013.01); *H04W 80/08* (2013.01)

(56) References Cited

U.S. PATENT DOCUMENTS

| | | | |
|---|---|---|---|
| 2016/0373972 A1 | 12/2016 | Vesely et al. | |
| 2017/0201603 A1 | 7/2017 | Uchino et al. | |
| 2018/0035339 A1 | 2/2018 | Mitsui et al. | |
| 2018/0098250 A1* | 4/2018 | Vrzic | H04W 36/0016 |
| 2018/0270713 A1* | 9/2018 | Park | H04L 5/0053 |
| 2018/0270894 A1* | 9/2018 | Park | H04W 76/14 |
| 2018/0279169 A1 | 9/2018 | Wang et al. | |
| 2018/0279193 A1* | 9/2018 | Park | H04W 76/27 |
| 2018/0279218 A1* | 9/2018 | Park | H04W 48/20 |
| 2018/0279229 A1* | 9/2018 | Dinan | H04W 74/0833 |
| 2018/0310202 A1* | 10/2018 | Löhr | H04W 28/065 |
| 2018/0324641 A1* | 11/2018 | Tsai | H04W 72/04 |
| 2018/0324642 A1* | 11/2018 | Yu | H04L 5/0053 |
| 2018/0367288 A1* | 12/2018 | Vrzic | H04W 36/2 |
| 2018/0368107 A1* | 12/2018 | Babaei | H04L 1/1838 |
| 2018/0368132 A1* | 12/2018 | Babaei | H04L 1/1819 |
| 2018/0376457 A1* | 12/2018 | Tseng | H04L 1/16 |
| 2019/0289489 A1* | 9/2019 | Yi | H04W 28/0205 |
| 2020/0099484 A1* | 3/2020 | Yi | H04W 76/15 |
| 2020/0107392 A1* | 4/2020 | Yi | H04L 1/22 |
| 2020/0235869 A1* | 7/2020 | Pradas | H04L 1/1867 |
| 2020/0288354 A1* | 9/2020 | Salkintzis | H04W 76/38 |
| 2023/0108496 A1* | 4/2023 | Ohlsson | H04W 36/18 370/329 |
| 2023/0231655 A1* | 7/2023 | Yue | H04L 1/08 370/328 |
| 2023/0276321 A1* | 8/2023 | Da Silva | H04W 24/10 370/252 |
| 2023/0276391 A1* | 8/2023 | Qiao | H04L 43/0858 370/350 |

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages.
3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.
3GPP TR 38.913 V14.2.0, "3rd Generation Partnership Project; Technical Specification Group Radio Access Network; Study on Scenarios and Requirements for Next Generation Access Technologies; (Release 14)," Mar. 2017, 38 pages.
3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Mar. 2017, 330 pages.
3GPP TS 36.321 V14.1.0, "3rd Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.
3GPP TS 36.331 V14.2.2, "3rd Generation Partnership Project; Technical Specification Group Radio Access Network; Evolved Universal Terrestrial Radio Access (E-UTRA); Radio Resource Control (RRC); Protocol specification (Release 14)," Apr. 2017, 721 pages.
3GPP TS 36.423 V14.2.0, "3rd Generation Partnership Project; Technical Specification Group Radio Access Network; Evolved Universal Terrestrial Radio Access Network (E-UTRAN); X2 application protocol (X2AP) (Release 14)," Mar. 2017, 242 pages.
3GPP TS 38.300 V0.2.0, "3rd Generation Partnership Project; Technical Specification Group Radio Access Network; NG Radio Access Network; Overall Description; Stage 2 (Release 15)," May 2017, 33 pages.
3GPP TS 38.300 V0.4.1, "3rd Generation Partnership Project; Technical Specification Group Radio Access Network; NR; NR and NG-RAN Overall Description; Stage 2 (Release 15)," Jun. 2017, 55 pages.
Extended European Search Report, dated Nov. 3, 2017, for European Application No. 17177942.4-1854, 12 pages.
Huawei, HiSilicon, "Enhancements for robust handover," R2-1703380, Agenda item: 10.2.4.4, 3GPP TSG-RAN2 #97bis, Spokane, Washington, Apr. 3-7, 2017, 4 pages.
Huawei, HiSilicon, "Robust data transmission during handover using packet duplication," R2-1706710, Agenda item: 10.2.8, 3GPP TSG_RAN2 NR Ad Hoc, Qingdao, China, Jun. 27-29, 2017, 6 pages.
International Search Report, dated Jul. 10, 2018, for International Application No. PCT/EP2018/063551, 3 pages.
Chinese Office Action, dated May 19, 2021, for Chinese Application No. 201880042590.0, 27 pages. (with English Translation).
LG Electronics Inc., "Packet Duplication in PDCP," 3GPP TSG-RAN WG2 #97, R2-1701462, Agenda Item: 10.2.1.2, Athens, Greece, Feb. 13-17, 2017, 2 pages.

* cited by examiner

Fig. 13A

| DRB 4 | DRB 3 | DRB 2 | DRB 1 | DRB 0 | SRB 2 | SRB 1 | SRB 0 |
|---|---|---|---|---|---|---|---|
| 0 | 0 | 1 | 1 | 1 | 1 | 1 | 1 |

Fig. 13B

| DRB 4 | DRB 3 | DRB 2 | DRB 1 | DRB 0 | SRB 2 | SRB 1 | SRB 0 |
|---|---|---|---|---|---|---|---|
| 0 | 0 | 1 | 1 | 1 | 1 | 1 | 1 |

Option 1

| DRB 7 | DRB 6 | DRB 5 | DRB 4 | DRB 3 | DRB 2 | DRB 1 | DRB 0 |
|---|---|---|---|---|---|---|---|
| 0 | 0 | 0 | 0 | 0 | 1 | 1 | 1 |

Option 2

| | | | | | SRB 2 | SRB 1 | SRB 0 |
|---|---|---|---|---|---|---|---|
| R | R | R | R | R | 1 | 1 | 1 |

Fig. 17A

| | DRB 4 | DRB 3 | DRB 2 | DRB 1 | DRB 0 | SRB 2 | SRB 1 | SRB 0 |
|---|---|---|---|---|---|---|---|---|
| LCID | 0 | 0 | 1 | 1 | 1 | 1 | 1 | 1 |

Fig. 17B

| | DRB 7 | DRB 6 | DRB 5 | DRB 4 | DRB 3 | DRB 2 | DRB 1 | DRB 0 |
|---|---|---|---|---|---|---|---|---|
| LCID | 0 | 0 | 0 | 0 | 0 | 1 | 1 | 1 |

| | SRB 2 | SRB 1 | SRB 0 | | | | | |
|---|---|---|---|---|---|---|---|---|
| LCID | 1 | 1 | 1 | R | R | R | R | R |

Fig. 18A

| D/C | PDU Type | SRB 0 | SRB 1 | SRB 2 | DRB 1 | | Oct 1 |
|---|---|---|---|---|---|---|---|
| DRB 2 | DRB 3 | DRB 4 | DRB 5 | DRB 6 | DRB 7 | DRB 8 | DRB 9 | Oct 2 |

| D/C | PDU Type | SRB 0 | SRB 1 | SRB 2 | R |
|---|---|---|---|---|---|

| D/C | PDU Type | DRB 0 | DRB 1 | DRB 2 | DRB 3 |
|---|---|---|---|---|---|

USER EQUIPMENT AND BASE STATION PARTICIPATING IN PACKET DUPLICATION DURING HANDOVER FOR NR

BACKGROUND

Technical Field

The present disclosure is directed to methods, devices and articles in communication systems, such as, 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see, e.g., 3GPP TR 38.913 "Study on Scenarios and Requirements for Next Generation Access Technologies", current version 14.2.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks. The services eMBB and URLLC are similar in that they both demand a very broad bandwidth, however are different in that the URLLC service requires ultra-low latencies.

A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Since the standardization for the NR of $5^{th}$ Generation systems of 3GPP is at the very beginning, there are several issues that remain unclear. For instance, there has been discussion on supporting packet duplication for user plane and control plane transmissions as one approach to ensure reliability and reduce HARQ latency. However, definite agreements on how to effectively implement packet duplication have not been reached yet. For instance, procedure need to be defined to allow an efficient and seamless packet duplication process also in handover scenarios.

BRIEF SUMMARY

One non-limiting and exemplary embodiment facilitates providing an improved packet duplication procedure during handover, in which different entities (UE, gNBs) are participating.

In one general aspect, the techniques disclosed here feature a source base station. The source base station comprises a processing circuitry, which when in operation, generates a user equipment packet duplication status. The user equipment packet duplication status includes information on the status of uplink packet duplication performed by a user equipment with the source base station and at least one further base station. The information on the status of uplink packet duplication is per uplink radio bearer, one or more uplink radio bearers being established between the user equipment and the source base station. The source base station further comprises a transmitter, which when in operation, transmits the user equipment packet duplication status to a target base station which is the target of a handover from the source base station performed for the user equipment.

In one general aspect, the techniques disclosed here feature a target base station that comprises a receiver, which when in operation, receives a user equipment packet duplication status. The user equipment packet duplication status includes information on the status of uplink packet duplication performed by a user equipment with a source base station and at least one further base station. The target base station being the target of a handover from the source base station performed for the user equipment. The information on the status of uplink packet duplication is per uplink radio bearer, one or more uplink radio bearers being established between the user equipment and the source base station. The target base station further comprises a processing circuitry, which when in operation, processes the received user equipment packet duplication status to configure packet duplication of uplink radio bearers to be established between the user equipment and the target base station after the handover.

In one general aspect, the techniques disclosed here feature a user equipment that comprises a processing circuitry, which when in operation, generates a user equipment packet duplication status. The user equipment packet duplication status includes information on the status of uplink packet duplication to be performed by the user equipment with a target base station and at least one further base station. The target base station being the target of a handover from a source base station to be performed for the user equipment.

The information on the status of uplink packet duplication is per uplink radio bearer, one or more uplink radio bearers being established between the user equipment and the target base station after the handover. The user equipment further comprises a transmitter, which when in operation, transmits the generated user equipment packet duplication status to the target base station.

In one general aspect, the techniques disclosed here feature a method for operating a source base station. The method comprises the following steps performed by the source base station. A user equipment packet duplication status is generated, which includes information on the status of uplink packet duplication performed by a user equipment with the source base station and at least one further base station. The information on the status of uplink packet duplication is per uplink radio bearer, one or more uplink radio bearers being established between the user equipment and the source base station. The user equipment packet duplication status is transmitted to a target base station which is the target of a handover from the source base station performed for the user equipment.

In one general aspect, the techniques disclosed here feature a method for operating a target base station. The method comprises the following steps performed by the target base station. A user equipment packet duplication status is received, which includes information on the status of uplink packet duplication performed by a user equipment with a source base station and at least one further base station, the target base station being the target of a handover from the source base station performed for the user equipment. The information on the status of uplink packet duplication is per uplink radio bearer, one or more uplink radio bearers being established between the user equipment and the source base station. The received user equipment packet duplication status is processed to configure packet duplication of uplink radio bearers to be established between the user equipment and the target base station after the handover.

In one general aspect, the techniques disclosed here feature a method for operating a user equipment. The method comprises the following steps performed by the user equipment. A user equipment packet duplication status is generated, which includes information on the status of uplink packet duplication to be performed by the user equipment with a target base station and at least one further base station, the target base station being the target of a handover from a source base station to be performed for the user equipment. The information on the status of uplink packet duplication is per uplink radio bearer, one or more uplink radio bearers being established between the user equipment and the target base station after the handover. The generated user equipment packet duplication status is transmitted to the target base station.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 13A illustrates the content of a UE packet duplication status, FIG. 13B illustrates an alternative implementation of signaling the content of a UE packet duplication status via X2 interface, FIG. 17A illustrates the content of a UE packet duplication status in the MAC CE format, FIG. 17B illustrates the content of a UE packet duplication status in the MAC CE format, FIG. 18A illustrates the content of a UE packet duplication status in the PDCP control PDU format, FIG. 18B illustrates the content of a UE packet duplication status in the PDCP control PDU format.

DETAILED DESCRIPTION

Basis of the Present Disclosure

5G NR System Architecture and Protocol Stacks

As presented in the background section, 3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
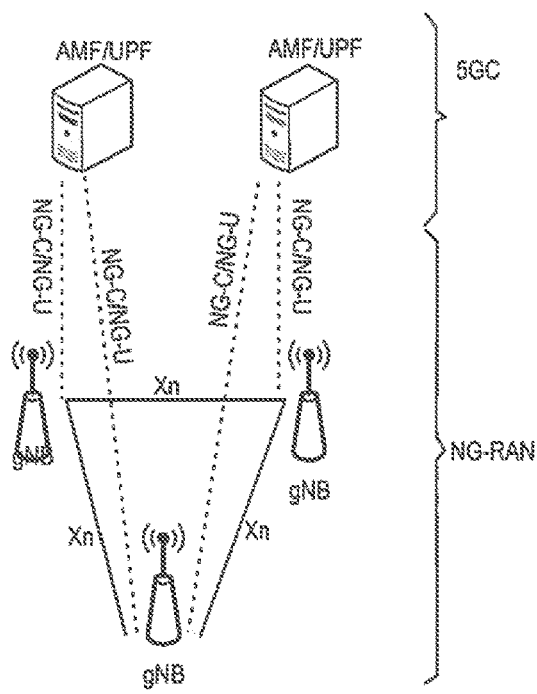
FIG. 1 shows an exemplary architecture for a 3GPP NR system.

Among other things, there has been a provisional agreement on the overall system architecture. The NG-RAN (Next Generation-Radio Access Network) consists of gNBs, providing the NG-Radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) by means of the NG-C interface and to the UPF (User Plane Function) by means of the NG-U interface. The NG-RAN architecture is illustrated in FIG. 1, as taken from the TS 38.300 v. 0.4.1, section 4 incorporated herein by reference.

Figure 2:
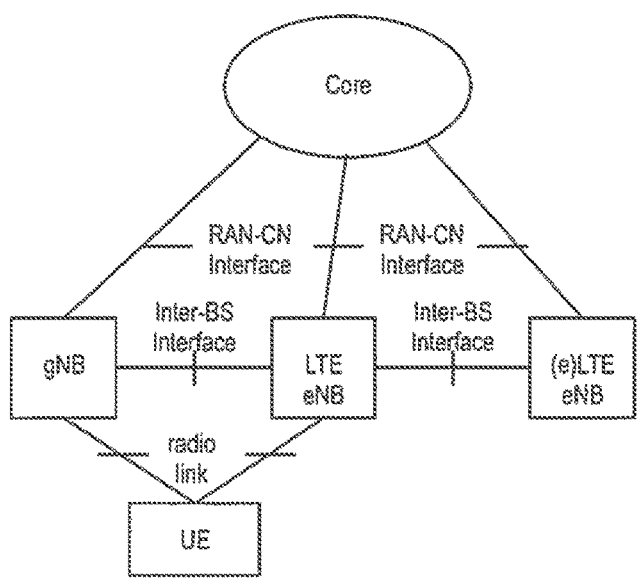
FIG. 2 shows an exemplary user and control plane architecture for the LTE eNB, gNB, and UE, FIG. 3 exemplarily shows exchange of PDUs and SDUs between layers in the OSI model.

Various different deployment scenarios are currently being discussed for being supported, as reflected, e.g., in 3GPP TR 38.801 v14.0.0 incorporated herein by reference in its entirety. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of TR 38.301, while additionally illustrating an LTE eNB as well as a user equipment (UE) that is connected to both a gNB and an LTE eNB (which is to be understood as an eNB according to previous 3GPP standard releases such as for LTE and LTE-A). As mentioned before, the new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

The user plane protocol stack for NR is currently defined in TS 38.300 v0.4.1, section 4.4.1. The PDCP (Packet Data Convergence Protocol), RLC (Radio Link Control) and MAC (Medium Access Control) sublayers are terminated in the gNB on the network side. Additionally, a new access stratum (AS) sublayer (SDAP, Service Data Adaptation Protocol) is introduced above PDCP as described in sub-clause 6.5 of S TS 38.300 v0.4.1. The control plane protocol stack for NR is defined in TS 38.300, section 4.4.2. An overview of the Layer 2 functions is given in sub-clause 6, of TS 38.300. The functions of the PDCP, RLC and MAC sublayers are listed in sub-clauses 6.4, 6.3, and 6.2 of TS 38.300. The functions of the RRC layer are listed in sub-clause 7 of TS 38.300. The mentioned sub-clauses of TS 38.300 v0.2.0 are incorporated herein by reference.

The new NR layers exemplarily assumed at present for the 5G systems may be based on the user plane layer structure currently used in LTE(-A) communication systems. However, it should be noted that no final agreements have been reached at present for all details of the NR layers.

PDCP Layer PDUs

Figure 3:
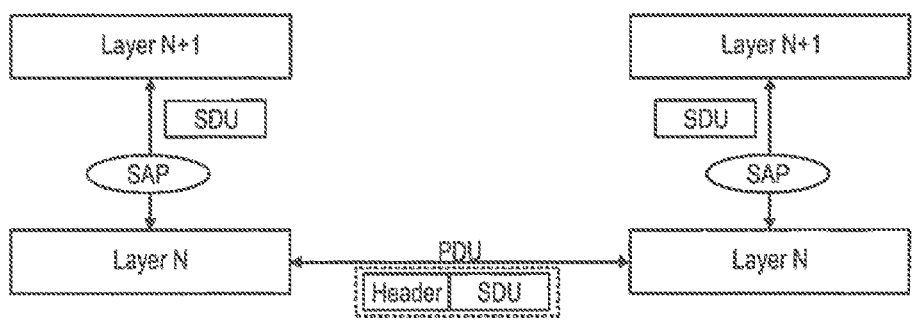

The terms service data unit (SDU) and protocol data unit (PDU) as used in the following herein will be explained in connection with FIG. 3. In order to formally describe in a generic way the exchange of packets between layers in the OSI model (such as the above mentioned MAC, RLC, and PDCP), SDU and PDU entities have been introduced. An SDU is a unit of information (data/information block) transmitted from a protocol at the layer N+1 that requests a service from a protocol located at layer N via a so-called service access point (SAP). A PDU is a unit of information exchanged between peer processes at the transmitter and at the receiver of the same protocol located at the same layer N.

A PDU is generally formed by a payload part consisting of the processed version of the received SDU(s) preceded by a layer-N specific header and optionally terminated by a trailer. Since there is no direct physical connection (except for Layer 1) between these peer processes, a PDU is forwarded to the layer-N−1 for processing. Therefore, a layer N PDU is from a layer-N−1 point of view an SDU.

At the transmitting side, each layer receives an SDU from a higher layer for which the layer provides a service and outputs a PDU to the layer below. The RLC layer receives packets from the PDCP layer. These packets may be called PDCP PDUs from a PDCP point of view and represent RLC SDUs from an RLC point of view. The RLC layer creates packets which are provided to the layer below, i.e., the MAC layer. The packets provided by RLC to the MAC layer are RLC PDUs from an RLC point of view and MAC SDUs from a MAC point of view. At the receiving side, the process is reversed, with each layer passing SDUs up to the layer above, where they are received as PDUs.

Some initial and provisional agreements for the PDCP layer for 5G NR can be found in TS 38.300 v0.4.1 section 6.4. The PDCP layer manages data streams in the user plane, as well as in the control plane. As in LTE, it may be exemplary assumed that two different types of PDCP PDUs are defined also for 5 g NR: PDCP Data PDUs and PDCP Control PDUs. PDCP Data PDUs are used for both control and user plane data. PDCP Control PDUs may be used to transport the feedback information for header compression, and for PDCP status reports which are used in case of handover and hence are only used within the user plane.

Figure 4:
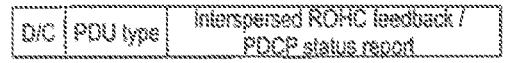
FIG. 4 illustrates an exemplary PDCP Control PDU used by PDCP entities handling user plane data.

PDCP Control PDUs, the format of which is exemplarily illustrated in FIG. 4, are used by PDCP entities handling user plane data. There are two types of PDCP Control PDUs, distinguished by the PDU Type field in the PDCP header. PDCP Control PDUs carry either PDCP "Status Reports" for the case of lossless handover, or ROHC (robust header compression) feedback created by the ROHC header compression protocol. PDCP Control PDUs carrying ROHC feedback are used for user plane radio bearers mapped on either RLC UM or RLC AM, while PDCP control PDUs carrying PDCP Status Reports are used only for user plane radio bearers mapped on RLC AM.

Dual-Connectivity (DC) and Multi-Connectivity (MC) Architecture

Multi-connectivity between LTE and the new radio access technology NR 5G may be supported, and can be based on the concept of dual connectivity (already known from previous 3GPP releases for LTE and LTE-A, explained in brief later). Multi-connectivity can be defined as a mode of operation where a multiple-Rx/Tx UE in the Connected Mode is configured to utilize radio resources amongst E-UTRA and NR provided by multiple distinct schedulers (e.g., LTE eNB and gNB) connected via a non-ideal backhaul link. Multi-connectivity (also Dual Connectivity) can, e.g., allow the UE to be at the same time connected to an LTE(-A) network and a new 5G network (exemplarily termed LTE-NR multi-connectivity). Further, NR-NR multi-connectivity is also foreseen, i.e., the simultaneous connections to both a Master gNB and at least one Secondary gNB.

Dual Connectivity between LTE and NR, and different options in said respect, is currently discussed in TR 38.801 v 14.0.0, section 10.1 "Dual Connectivity between NR and LTE", incorporated herein by reference.

Figure 5:
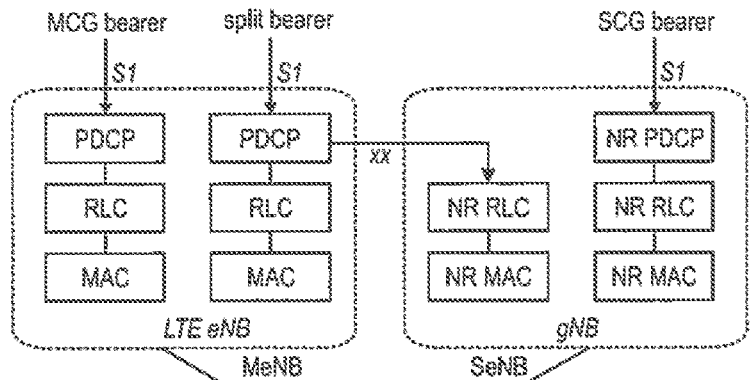
FIG. 5 illustrates an exemplary and general user plane architecture currently discussed in connection with LTE-NR multi-connectivity with an MCG (Master Cell Group) bearer via the LTE eNB.
Figure 6A:
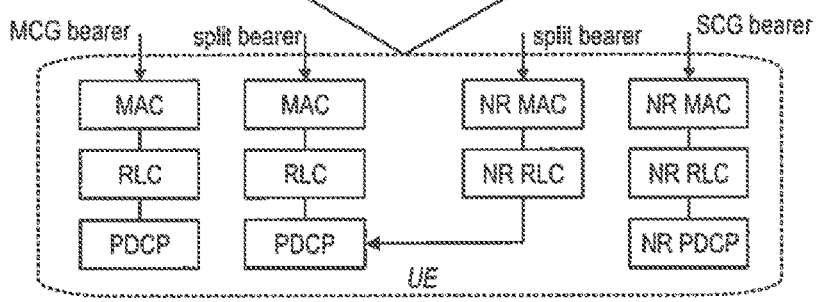
FIG. 6A illustrates the general user plane architecture, where the PDCP entity being at the LTE (master) eNB, Secondary side
Figure 6A:
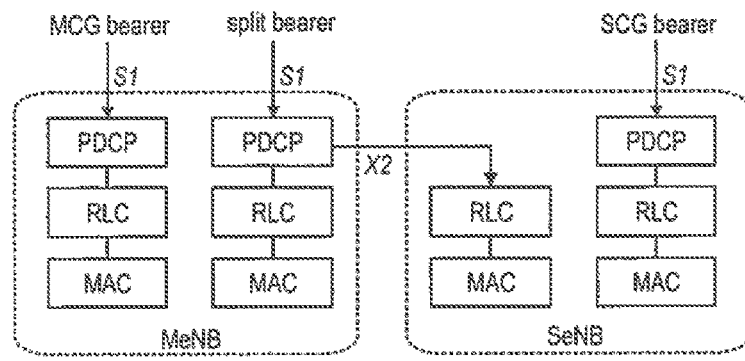

FIG. 5 illustrates an exemplary and general user plane architecture currently discussed in connection with LTE-NR multi-connectivity with an MCG (Master Cell Group) bearer via the LTE eNB, a bearer which is split between the LTE eNB and the gNB (the PDCP entity being at the LTE (master) eNB, see FIG. 6A), and an SCG (Secondary Cell Group) bearer via the gNB (see, e.g., 3GPP TR 38.801 section 10.1 incorporated herein by reference). It should be noted that the split radio bearer can also be implemented by having the PDCP entity at the Secondary side (i.e., the gNB, see also FIG. 6B) (see also TR 38.801, section 10.1). FIG. 5 also illustrates the exemplary user plane architecture for the UE showing the various layers in the UE for handling data packets received via the bearers from the LTE eNB and the gNB.

In turn, Intra-NR (NR-NR) Dual Connectivity is briefly mentioned in section 10.2.5 "Intra-NR dual connectivity", incorporated herein by reference. As apparent therefrom, some or all of the main principles from legacy LTE Dual Connectivity can be exemplarily inherited by the intra-NR dual connectivity, with potential enhancements. Details in said respect are however to be still discussed in the normative phase.

The so-called "dual connectivity" concept in LTE refers to a mode of operation of a UE (in RRC_CONNECTED state), configured with a Master Cell Group (MCG) and a Secondary Cell Group (SCG). Dual connectivity is mainly defined in the 3GPP technical standard TS 36.300, v14.2.0, incorporated herein by reference, e.g., sections 4.9, 6.5, 7.6, 10.1.2.3.4, 10.1.2.8, and Annex M thereof. Furthermore, reference is made to 3GPP TR 38.801, Section 10, Version 14.0.0, RAN Meeting #75, incorporated herein by reference.

Figure 6B:
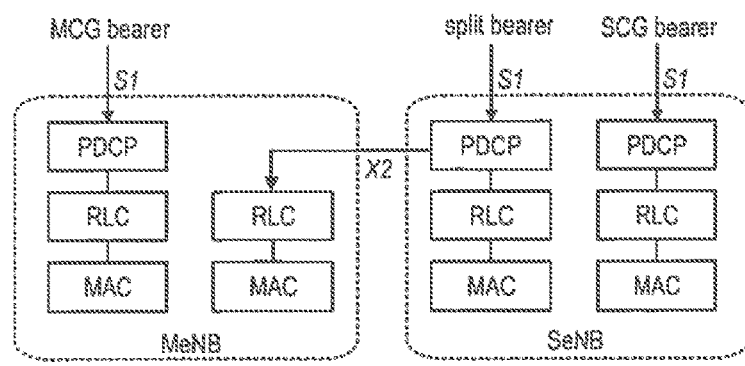
FIG. 6B illustrates the general user plane architecture, where the PDCP entity being at the Secondary side.

E-UTRAN (LTE) supports Dual Connectivity (DC) operation whereby a multiple Rx/Tx UE in RRC_CONNECTED is configured to utilize radio resources provided by two distinct schedulers, located in two eNBs connected via a non-ideal backhaul over the X2 interface. eNBs involved in DC for a certain UE may assume two different roles: an eNB may either act as an MeNB or as an SeNB. In DC a UE is connected to at least one MeNB and one SeNB, and the radio protocol architecture that a particular bearer uses depends on how the bearer is setup. Three bearer types exist: MCG bearer, SCG bearer and split bearer. Those bearer types are illustrated in FIGS. 6A and 6B. Inter-eNB control plane signaling for DC is performed by means of X2 interface signaling. Control plane signaling towards the MME is performed by means of S1 interface signaling.

Figure 7:
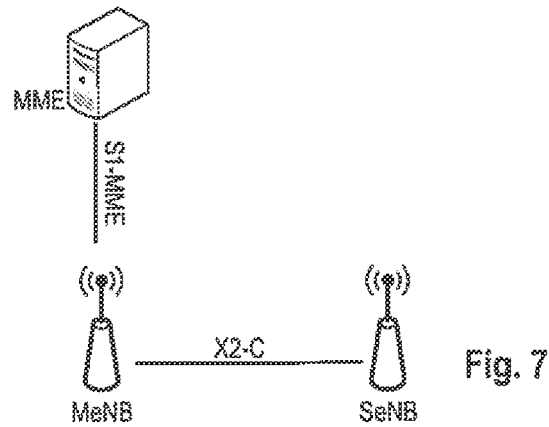
FIG. 7 shows the Control-Plane connectivity of eNBs involved in DC for a certain UE where the S1-MME is terminated in MeNB and the MeNB and the SeNB are interconnected via X2-C.

There is only one S1-MME connection per DC UE between the MeNB and the MME. Each eNB should be able to handle UEs independently, i.e., provide the PCell to some UEs while providing SCell(s) for SCG to others. Each eNB involved in DC for a certain UE controls its radio resources and is primarily responsible for allocating radio resources of its cells. Respective coordination between MeNB and SeNB is performed by means of X2 interface signaling. FIG. 7 shows the Control-Plane connectivity of eNBs involved in DC for a certain UE: the S1-MME is terminated in MeNB and the MeNB and the SeNB are interconnected via X2-C.

Figure 8:
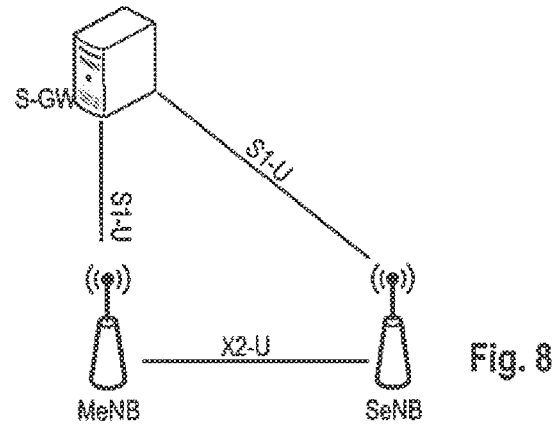
FIG. 8 shows different U-plane connectivity options of eNBs involved in DC for a certain UE.

For dual connectivity two different user plane architectures are allowed: one in which the S1-U only terminates in the MeNB and the user plane data is transferred from MeNB to SeNB using the X2-U, and a second architecture where the S1-U can terminate in the SeNB. FIG. 8 shows different U-plane connectivity options of eNBs involved in DC for a certain UE. For MCG bearers, the S1-U connection for the corresponding bearer(s) to the S-GW is terminated in the MeNB. The SeNB is not involved in the transport of user plane data for this type of bearer(s) over the Uu. For split bearers, the S1-U connection to the S-GW is terminated in the MeNB. PDCP data is transferred between the MeNB and the SeNB via X2-U. The SeNB and MeNB are involved in transmitting data of this bearer type over the Uu. For SCG bearers, the SeNB is directly connected with the S-GW via S1-U. The MeNB is not involved in the transport of user plane data for this type of bearer(s) over the Uu.

In case of DC, the UE is configured with two MAC entities: one MAC entity for MeNB and one MAC entity for SeNB.

RACH Procedure

No final agreement has been reached with regard to the RACH (Random Access Channel) procedure in 5G NR. As described in section 9.2 of TR 38.804 v14.0.0, incorporated herein by reference, the NR RACH procedure may support both contention-based and contention-free random access, in the same or similar manner as defined for LTE. Also, the design of the NR RACH procedure shall support a flexible message 3 size, similar as in LTE.

Figure 9:
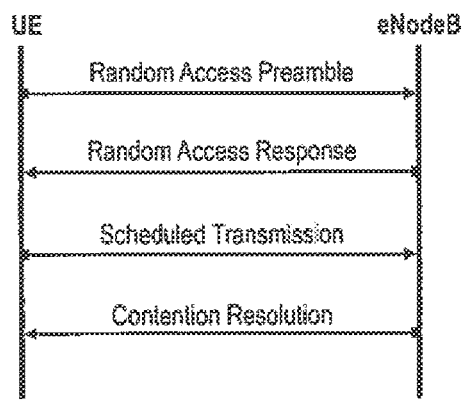
FIG. 9 illustrates the LTE contention based random access procedure.

The LTE RACH procedure will be described in the following in more detail, with reference to FIGS. 9 and 10. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. Essentially the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

LTE offers two types of random access procedures allowing access to be either contention based, i.e., implying an inherent risk of collision, or contention-free (non-contention based). A detailed description of the random access procedure can be also found in 3GPP TS 36.321, section 5.1. v14.1.0 incorporated herein by reference.

In the following the LTE contention based random access procedure is being described in more detail with respect to FIG. 9. This procedure consists of four "steps". First, the user equipment transmits a random access preamble on the Physical Random Access Channel (PRACH) to the eNodeB (i.e., message 1 of the RACH procedure). After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) which RACH preamble was detected until the RACH procedure is finished, since the "real" identity of the mobile at this point is not yet known by the eNodeB.

The user equipment monitors the PDCCH for reception of the random access response message within a given time window, which is configured by the eNodeB. In response to the RAR message received from the eNodeB, the user equipment transmits the first scheduled uplink transmission on the radio resources assigned by the grant within the random access response. This scheduled uplink transmission conveys the actual random access procedure message like for example an RRC connection request or a buffer status report.

In case of a preamble collision having occurred in the first of the RACH procedure, i.e., multiple user equipments have sent the same preamble on the same PRACH resource, the colliding user equipments will receive the same T-CRNTI within the random access response and will also collide in the same uplink resources when transmitting their scheduled transmission in the third step of the RACH procedure. In case the scheduled transmission from one user equipment is successfully decoded by eNodeB, the contention remains unsolved for the other user equipment(s). For resolution of this type of contention, the eNode B sends a contention resolution message (a fourth message) addressed to the C-RNTI or Temporary C-RNTI.

Figure 10:
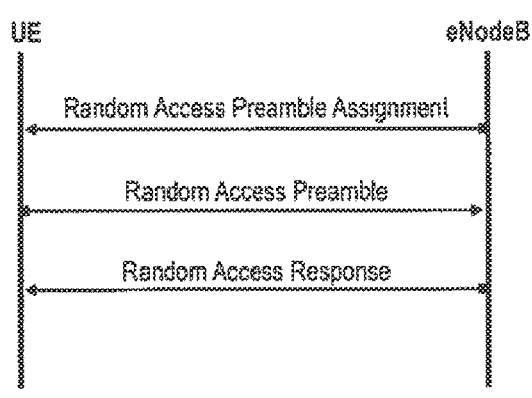
FIG. 10 illustrates the contention-free random access procedure of 3GPP LTE.

FIG. 10 is illustrating the contention-free random access procedure of 3GPP LTE, which is simplified in comparison to the contention-based random access procedure. The eNodeB provides in a first step the user equipment with the preamble to use for random access so that there is no risk of collisions, i.e., multiple user equipments transmitting the same preamble. Accordingly, the user equipment is subsequently sending the preamble which was signaled by eNodeB in the uplink on a PRACH resource. Since the case that multiple UEs are sending the same preamble is avoided for a contention-free random access, essentially, a contention-free random access procedure is finished after having successfully received the random access response by the UE.

Thus, a similar or same RACH procedure as just explained in connection with FIGS. 9 and 10 could be adopted in the future for the new radio technology of 5G. However, 3GPP is also studying a two-step RACH procedure for 5G NR, where a message 1, that corresponds to messages 1 and 3 in the four-step RACH procedure, is transmitted at first. Then, the gNB will respond with a message 2, corresponding to messages 2 and 4 of the LTE RACH procedure. Due to the reduced message exchange, the latency of the two-step procedure may be reduced compared to the four-step procedure. The radio resources for the messages are optionally configured by the network.

LTE Handover Procedure

Mobility is a key procedure in LTE communication system. There are two types of handover procedures in LTE for UEs in active mode: the S1-handover and the X2-handover procedure. For intra-LTE mobility, the handover via the X2 interface is normally used for the inter-eNodeB mobility. Thus, the X2 handover is triggered by default unless there is no X2 interface established or the source eNodeB is configured to use another handover (e.g., the S1-handover) instead. More information on mobility procedures in LTE can be obtained, e.g., from 3GPP TS 36.331 v14.2.2, section 5.4 incorporated herein by reference, and from 3GPP 36.423 v14.2.0 section 8.2 incorporated herein by reference.

Figure 11:
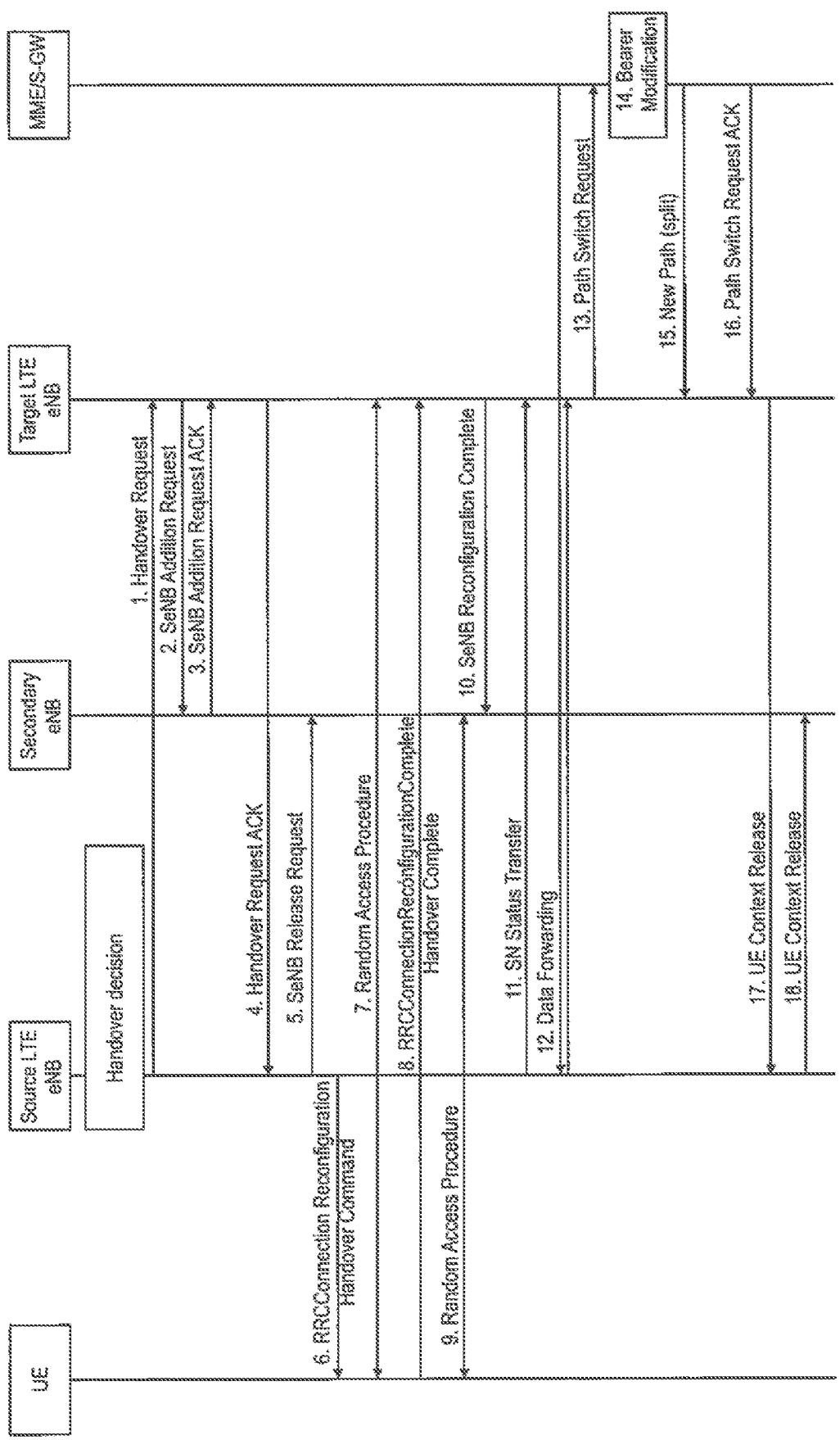
FIG. 11 illustrates an example signaling flow for this inter-MeNB handover without SeNB change.

Now considering the Dual-Connectivity and Multi-Connectivity scenario, handover of the MeNB can be performed without changing the SeNB. Such a handover (exemplarily termed inter-MeNB handover) is defined in LTE in TS 36.300 v14.2.0, section 10.1.2.8.8 "Inter-MeNB handover without SeNB change". FIG. 11 illustrates an example signaling flow for this inter-MeNB handover without SeNB change, with the steps as described by TS 36.300 in the following:

1. The source MeNB starts the handover procedure by initiating the X2 Handover Preparation procedure. The source MeNB includes the SCG configuration in the HandoverPreparationInformation. The source MeNB includes the SeNB UE X2AP ID and SeNB ID as a reference to the UE context in the SeNB that was established by the source MeNB in the Handover Request message.
2. If the target MeNB decides to keep the SeNB, the target MeNB sends SeNB Addition Request to the SeNB including the SeNB UE X2AP ID as a reference to the UE context in the SeNB that was established by the source MeNB.
3. The SeNB replies with SeNB Addition Request Acknowledge.
4. The target MeNB includes within the Handover Request Acknowledge message a transparent container to be sent to the UE as an RRC message to perform the handover which also includes the SCG configuration, and may also provide forwarding addresses to the source MeNB. The target MeNB indicates to the source MeNB that the UE context in the SeNB is kept if the target MeNB and the SeNB decided to keep the UE context in the SeNB in step 2 and step 3.
5. The source MeNB sends SeNB Release Request to the SeNB. The source MeNB indicates to the SeNB that the UE context in SeNB is kept. If the indication as the UE context kept in SeNB is included, the SeNB keeps the UE context.
6. The source MeNB triggers the UE to apply the new configuration.
7/8. The UE synchronizes to the target MeNB and replies with RRCConnectionReconfigurationComplete message.
9. The UE synchronizes to the SeNB.
10. If the RRC connection reconfiguration procedure was successful, the target MeNB informs the SeNB.
11/12. Data forwarding from the source MeNB takes place. Data forwarding may be omitted for SCG bearers. Direct data forwarding from the source MeNB to the SeNB is not possible for split bearers.

NOTE: Direct data forwarding may occur only for bearer type change.

13-16. The target MeNB initiates the S1 Path Switch procedure.

NOTE: If new UL TEIDs of the S-GW are included, the target MeNB performs MeNB initiated SeNB Modification procedure to provide them to the SeNB.

17. The target MeNB initiates the UE Context Release procedure towards the source MeNB.

18. Upon reception of the UE Context Release message, the SeNB can release C-plane related resource associated to the UE context towards the source MeNB. Any ongoing data forwarding may continue. The SeNB shall not release the UE context associated with the target MeNB if the indication was included in the SeNB Release Request in step 5.

A similar or the same handover procedure can be used in 5G NR.

NR PDCP Layer and Packet Duplication

Dual Connectivity and Multi Connectivity with packet duplication across multiple links are currently being discussed by 3GPP for the 5G NR so as to ensure high reliability such as required to support URLLC. In URLLC use cases, packets must be correctly received with an ultra-high reliability (e.g., 99.999%) and moreover within a required latency target (e.g., 1ms). In order to meet these requirements, existing techniques such as HARQ may not be sufficient.

A split bearer is configured with one PDCP entity and two RLC entities, one at the MCG (Master cell group) and the other at the SCG (Secondary Cell group). The data on the split bearer may be sent to either of the two RLC legs. Packet duplication is thus correspondingly to be understood as sending the same data packets over two legs (both RLC legs are active at a given time).

Packet duplication may not always be beneficial, and it should be deactivated when there is no gain available. Hence, dynamic activation and deactivation of packet duplication (e.g., by MAC CE or PDCP Control PDU) should be supported to cope with the dynamic channel quality change in the two RLC legs, after it has been configured for a SRB/DRB by RRC signaling.

TS 38.300 in section in 6.4 describes the main functions of the PDCP layer, including among other things duplicate detection and the duplication of PDCP PDUs. As defined therein, when duplication is configured for a radio bearer by RRC, an additional RLC entity and an additional logical channel are added to the radio bearer to handle the duplicated PDCP PDUs. Duplication at PDCP therefore consists in sending the same PDCP PDUs twice via two "legs": once on the original RLC entity and a second time on the additional RLC entity. When doing so, the original PDCP PDU and the corresponding duplicate shall not be transmitted on the same carrier. The two different logical channels can either belong to the same MAC entity (CA, Carrier Aggregation) or to different ones (DC, e.g., Dual Connectivity). In the former case, logical channel mapping restrictions are used in MAC to ensure that the logical channel carrying the original PDCP PDUs and the logical channel carrying the corresponding duplicates are not sent on the same carrier. Once configured for a radio bearer, duplication can be activated and de-activated by means of a MAC control element; as a further option it is discussed to support that packet duplication can be activated and deactivated by means of a PDCP Control PDU.

It should be noted that these definition are still under discussion and no final agreements have been reached. However, the function of packet duplication, either in the same or a similar form as just explained on the basis of TS 38.300 will be implemented for 5G NR. In particular, packet duplication is advantageously used to allow reducing the latency and increasing the reliability for both the user data and control signaling and can be used instead of link selection. The same techniques can also improve mobility robustness in challenging scenarios such as high mobility and ultra-dense deployments.

The PDCP function in the transmitter accordingly supports packet duplication, while the PDCP function in the receiver supports duplicate packet removal, i.e., detecting packet duplication and forwarding of a single packet to the upper layers.

One optional implementation detail currently being discussed is that the original PDCP PDU and the corresponding duplicate shall not be transmitted on the same transport block.

There are no final agreements with regard to how to implement packet duplication. 3GPP is discussing how to define at least one mechanism to start/stop PDCP duplication more quickly and will less signaling overhead compared to RRC reconfiguration.

The present disclosure thus shall present solutions facilitating to overcome one or more of the disadvantages and/or meet one or more of the requirements mentioned above.

DETAILED DESCRIPTION OF PRESENT DISCLOSURE

In the following, UEs, base stations, and procedures will be described for the new radio access technology envisioned for the 5G mobile communication systems. Different implementations and variants will be explained as well. The following detailed disclosure was facilitated by the discussions and findings as described in the previous section "Basis of the present disclosure" and may be based at least on part thereof.

In general, it should be however noted that only few things have been actually agreed on with regard to the 5G cellular communication system such that many assumptions have to be made in the following so as to be able to explain the principles underlying the present disclosure in a clear and understandable manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, terms of the procedures, entities, layer layers, etc., used in the following are closely related to LTE/LTE-A systems or to terminology used in the current study items for 3GPP 5G, even though specific terminology to be used in the context of the new radio access technology for the next 3GPP 5G communication systems is not fully decided yet. Thus, terms could be changed in the normative phase, without affecting the functioning of the embodiments of the invention. Consequently, a skilled person is aware that the invention and its scope of protection should not be restricted to particular terms exemplary used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

Figure 12:
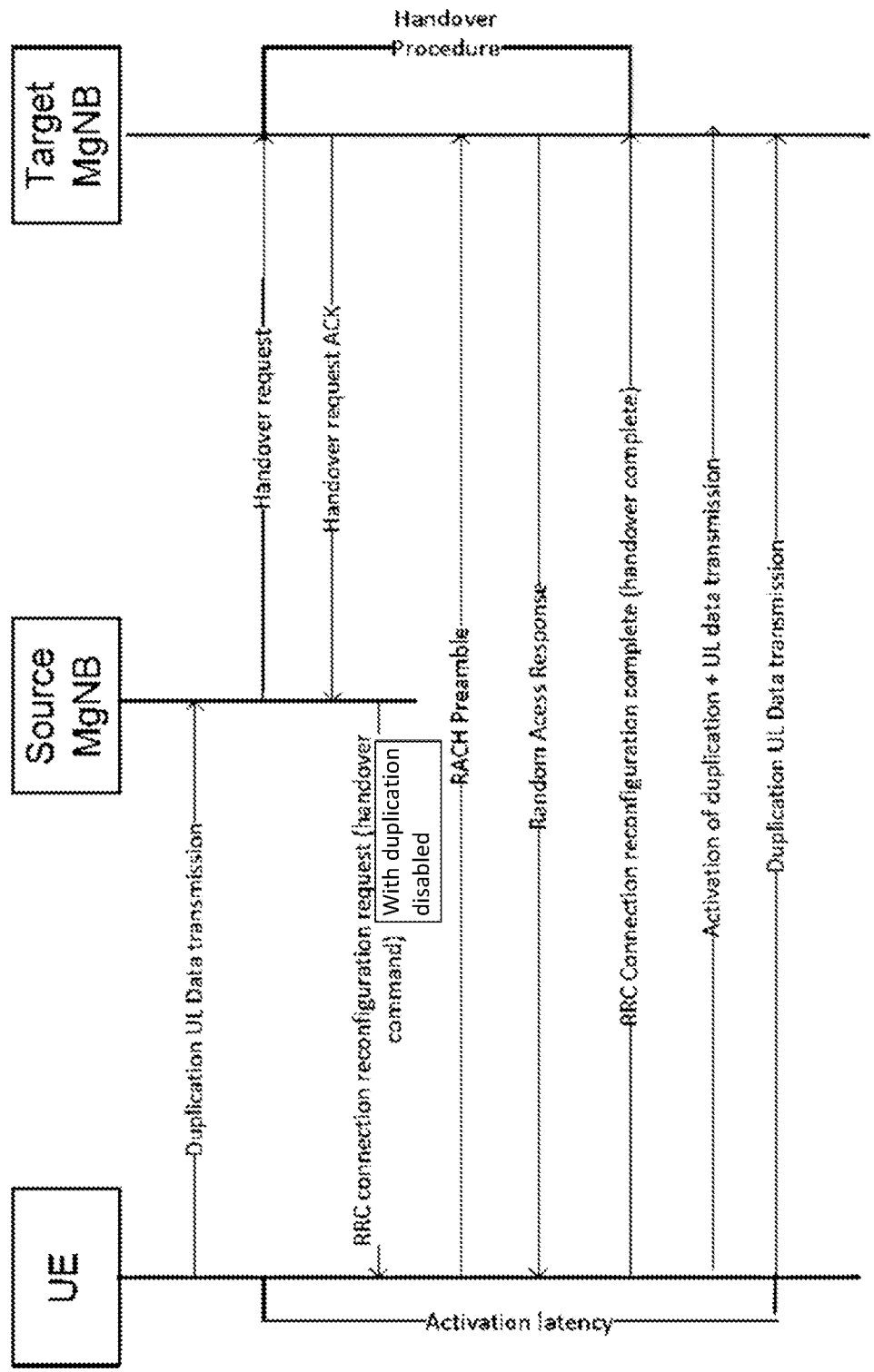
FIG. 12 illustrates a signaling diagram where messages are exchanged between a UE, a Source Master gNB, and a Target Master gNB.

FIG. 12 illustrates a signaling diagram where messages are exchanged between a UE, a Source Master gNB (MgNB), and a Target MgNB.

It is exemplarily assumed that the uplink radio bearer is a split radio bearer which is established between the UE and the Source MgNB, wherein the split radio bearer may have two legs being terminated at the user equipment on the one hand, as well as at the Source MgNB on the other hand, wherein the path of one of the two legs is via at least one other gNB, for instance a secondary gNB (SgNB). With reference to the illustration and description of FIGS. 5, 6A and 6B, the PDCP entity may exemplarily either be at the MgNB or at the SgNB.

Optionally, a Packet Data Convergence Protocol, PDCP, entity of the UE is shared for the split radio bearer, wherein the PDCP entity is located at the source MgNB, and wherein the data packets are PDCP protocol data units, PDCP PDUs.

As further illustrated in FIG. 12, uplink packet duplication is performed between the UE and the Source MgNB. In addition, the UE performs the packet duplication with at least one other gNB, for instance, a secondary gNB (SgNB).

Thereby, the UE performs uplink packet duplication by transmitting the same data packets to the Source MgNB and to the at least one other gNB, for instance the Secondary gNB (SgNB), and the Source MgNB participates as the receiving side of the uplink packet duplication performed by the UE by using both data packets received from the UE and from the at least one further gNB, to generate a single data packet to be forwarded to upper layers of the Source MgNB.

According to the scenario of FIG. 12, at a certain point in time, it may be decided to hand over the UE from the Source MgNB to the Target MgNB. In an alternative implementation where the PDCP entity is located at one of the other gNBs (e.g., Secondary gNB), a scenario is assumed where it is decided to hand over the UE from the at least one other gNB (here, e.g., to be termed Source SgNB) to a Target SgNB, instead of from the Source MgNB to the Target MgNB. For ease of explanation, in the following a scenario is mainly assumed where the PDCP entity is at the Source MgNB and the UE changes from the Source MgNB to a Target MgNB, while keeping the same Secondary gNBs. However, the subsequent embodiments are equally applicable to scenarios where the PDCP entity is located (not at the MgNB) but at a SgNB and thus the UE changes from one Source SgNB to another Target SgNB, while keeping the connection to the same Master gNB.

In order to avoid dropping packet duplication when handing over to a Target MgNB (or SgNB) for a UE, the Source MgNB may inform the Target MgNB about the packet duplication status of the UE.

According to one exemplary implementation, the Source MgNB generates a UE packet duplication status which includes information on the status of uplink packet duplication performed by the UE with the Source MgNB and the at least one other gNB. Thereby, the information on the status of uplink packet duplication is per uplink radio bearer, wherein one or more uplink radio bearers are established between the UE and the Source MgNB. The Source MgNB then transmits the UE packet duplication status to the Target MgNB which is the target of the handover from the Source MgNB performed for the UE.

According to a further exemplary implementation, the Target MgNB receives the UE packet duplication status which includes information on the status of uplink packet duplication performed by the UE with the Source MgNB and the at least one other gNB. The Target MgNB processes the received UE packet duplication status to configure packet duplication of uplink radio bearers to be established between the UE equipment and the Target MgNB after the handover.

As further illustrated in FIG. 12, the handover involves that the Source MgNB transmits a handover request to the Target MgNB, after which the Target MgNB responds to the Source MgNB with a handover request ACK. Subsequently, the Source MgNB transmits a handover commend to the UE. As exemplarily assumed in FIG. 12, the Activation of Duplication is transmitted after the handover is completed. Correspondingly, during the handover procedure the Target MgNB will assume (e.g., by default) that no packet duplication shall be used by the UE and thus the Handover Request ACK as well as the corresponding handover command transmitted by the Source MgNB to the UE will indicate that uplink duplication is disabled (see FIG. 12 "with duplication disabled"). Upon receipt of the handover command (such as an RRC connection reconfiguration request), the UE initiates a RACH procedure to establish a connection with the Target MgNB. Once the UE has transmitted a handover complete message to the Target MgNB and the connection with the Target MgNB is established, the UE may activate uplink duplication with the Target MgNB and correspondingly use uplink packet duplication with the subsequent uplink data transmissions.

Reference is made to FIG. 13A which illustrates the content of a UE packet duplication status, i.e., the current duplication status of the UE's used UL radio bearers, to be transmitted to the Target MgNB. More specifically, according to this exemplary illustration, it is assumed that the UE has established five uplink Data Radio Bearers (DRB) #0-#4 and that the UE packet duplication status can indicate up to five uplink DRBs #0-4.

For instance, DRB #0 and DRB #1 belong to the eMBB service, and DRB #2 belongs to the URLLC service. Duplication is exemplary assumed to be enabled for DRB #0, #1 and #2, but not for DRB #3 and #4. Such a packet duplication status of the UE may, for instance, be transmitted in the form of a bitmap including one bit per radio bearer. In the example of FIG. 13A, uplink duplication is activated for DRB #0, #1 and #2, which is accordingly indicated by flag "1" in the respective bit field. That is, uplink packet duplication for DRB #0, #1 and #2 is already activated/in an active state during the communication with the Source MgNB before transmitting the UE packet duplication status. Thus, in the UE packet duplication status to be transmitted to the Target MgNB, the respective flags for DRB #0, #1 and #2 are set to "1" (in the illustrated example) so as to inform the Target MgNB to use uplink duplication for DRB #0, #1 and #2 after the handover of the UE.

Further to the example of FIG. 13A, uplink duplication is deactivated for DRBs #3 and #4, which would be conversely indicated by a flag value "0" in the respective bit field. That is, uplink packet duplication for DRBs #3 and #4 is not in use/already deactivated before transmitting the UE packet duplication status. Thus, in the UE packet duplication status to be transmitted to the Target MgNB, the respective flags for DRB #3 and #4 are set to "0" so as to inform the Target MgNB to not use uplink duplication for DRB #3 and #4 after the handover of the UE.

Further to the example, uplink duplication is activated for Signaling Radio Bearers (SRB) #0, #1 and #2, which is indicated by flag "1" in the respective bit field of the UE packet duplication status. That is, uplink packet duplication for SRB #0, #1 and #2 is already activated/established before transmitting the UE packet duplication status. Thus, in the UE packet duplication status to be transmitted to the Target MgNB, the respective flags for SRB #0, #1 and #2 are set to "1" so as to inform the Target MgNB to use uplink duplication for SRB #0, #1 and #2 after the handover of the UE.

In one implementation, a status for each established uplink radio bearer is to be reported. In another exemplary implementation a status for a subset of the established uplink radio bearers (i.e., not all of the uplink radio bearers) is to be reported. In the example of FIG. 13A, a bitmap of eight bits is used, i.e., an octet of eight bits, which can be used for simultaneously informing the Target MgNB about the current status of eight UE uplink radio bearers. However, in an alternative implementation, only parts of the status of the currently used/established uplink radio bearers by the UE may be implemented in/notified by the UE packet duplication status.

In another exemplary implementation, the status of uplink packet duplication is either activated or deactivated per uplink radio bearer. In other words, each field/flag of the bitmap for each uplink radio bearer indicates to the Target MgNB the respective radio bearer for which uplink duplication should be activated (i.e., duplication switched on or to be kept active)/deactivated (i.e., duplication switched off or to be kept deactivated) also at the Target MgNB.

An uplink radio bearer may be a signaling uplink radio bearer, such as SRB as mentioned above in connection with FIG. 13A, or a data uplink radio bearer, such as DRB as mentioned above in connection with FIG. 13A.

In another exemplary implementation, the bitmap may have a fixed size of one or more octets.

FIG. 13B illustrates an alternative implementation of signaling the content of a UE packet duplication status.

As shown in FIG. 13B, the content of a UE packet duplication status to be transmitted in the exemplary bitmap as illustrated under Option 1 comprises information related to a combination of DRB duplication as well as SRB duplication, i.e., the bit fields are used for transmitting information on both, DRB duplication status as well as SRB duplication status together within one bitmap. In the exemplary illustration according to Option 1, DRB #0 to DRB #4 are indicated in the bitmap, wherein uplink packet duplication for DRB #0 to DRB #2 are activated and for DRB #3 and DRB #4 are deactivated, and where SRB #0 to SRB #2 are also indicated in the bitmap, uplink packet duplication for all these SRBs being activated.

As further shown in FIG. 13B, the content of a UE packet duplication status may alternatively be transmitted as exemplarily illustrated under Option 2 by using two bitmaps.

One bitmap is used for transmitting information related to DRB duplication only, i.e., the bit fields are exclusively used for transmitting information on DRB duplication status only within one bitmap. In the exemplary illustration according to Option 2, uplink packet duplication for DRB #0 to DRB #7 can be indicated in one bitmap, in this example for DRB #0 to DRB #2 as activated and for DRB #3 to DRB #7 as deactivated.

The other bitmap, as further shown in FIG. 13B, is used for transmitting information related to SRB duplication only, i.e., the bit fields are exclusively used for transmitting information on SRB duplication status only within one bitmap. In the exemplary illustration according to Option 2, uplink packet duplication for SRB #0 to SRB #2 can be indicated in this other bitmap, wherein it is exemplary assumed that uplink packet duplication is activated for SRB #0 to SRB #2. According to this exemplary illustration, the remaining bit fields are not assigned to any radio bearer and are reserved, indicated by "R" in the figure.

In other words, whereas Option 1 refers to the case with a combined DRB and SRB mapping within one bitmap, Option 2 refers to the case where DRB and SRB are individually mapped in separate bitmaps.

In Sub clause 9.1 of 3GPP TS 36.423 V14.2.0, the structure of the messages and information elements required for the X2AP protocol are illustrated in tabular format. With respect to Options 1 and 2 as discussed above, the following message functional definitions and contents are exemplarily proposed, as shown below in Table 1.

| IE/Group Name | Presence | Range | IE type and reference | Semantics Description | Criticality | Assigned Criticality |
|---|---|---|---|---|---|---|
| Option 1 Current status of duplication | M | | BIT STRING (SIZE (8 or 16 or 32)) | Information related to the duplication; the source gNB provides it in order to enable duplication in Target gNB. | YES | Ignore |
| Option 2 Current status of DRB duplication | M | | BIT STRING (SIZE (8 or 16 or 32)) | Information related to the DRB duplication; the source gNB provides it in order to enable duplication in Target gNB. | YES | Ignore |
| Option 2 Current status of SRB duplication | M | | BIT STRING (SIZE (8)) | Information related to the SRB duplication; the source gNB provides it in order to enable duplication in Target gNB. | YES | Ignore |

Figure 14:
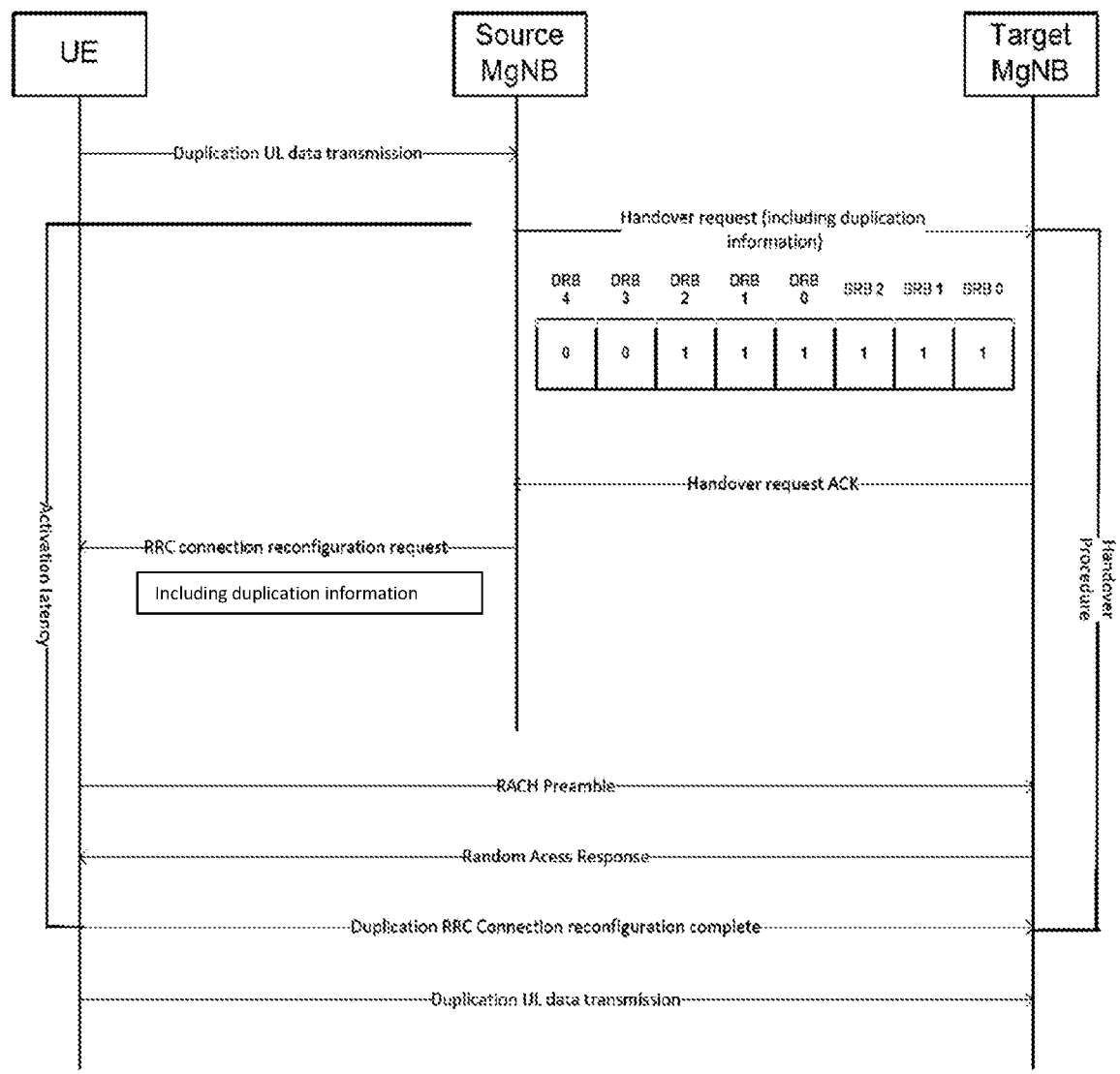
FIG. 14 illustrates a signaling diagram according to an improved implementation, where the UE packet duplication status is transmitted by the Source MgNB and received by the Target MgNB within a handover request message.

According to another implementation, the UE packet duplication status is transmitted by the Source MgNB and received by the Target MgNB during the handover procedure, which is initiated by the Source MgNB. FIG. 14 illustrates an exemplary implementation, where the UE packet duplication status is transmitted by the Source MgNB and received by the Target MgNB within a handover request message which is transmitted to the Target MgNB to initiate the handover for the UE. Thereby, the Source MgNB informs the Target MgNB via the corresponding inter-gNB interface with a handover request message about the UE packet duplication status.

According to still another implementation, the UE packet duplication status is transmitted by the Source MgNB within a handover request message which is transmitted to the Target MgNB to initiate the handover performed for the UE. As illustrated in FIG. 14, the bitmap, which includes duplication information, is transmitted within the handover request from the Source MgNB to the Target MgNB.

In reaction to the handover request, the Source MgNB receives from the Target MgNB an acknowledgment for the transmitted UE packet duplication status. Optionally, the acknowledgment is received by the Source MgNB/transmitted by the Target MgNB within a handover request acknowledgment message.

Subsequently, the Source MgNB transmits to the UE an acknowledgment to acknowledge the packet duplication status of the Target MgNB. Such acknowledgment may be transmitted to the UE together with an RRC connection reconfiguration request message as part of the usual handover procedure. Such acknowledgment sent from the Source MgNB to the UE acknowledges that the Target MgNB has received the packet publication status as previously transmitted by the Source MgNB and may exemplarily inform the UE about the uplink packet duplication to be used when communicating with the Target MgNB. The acknowledgment may be transmitted to the UE with a handover command message. In a further exemplary implementation, the transmitted acknowledgment includes the information on the status of uplink packet duplication performed by the UE, wherein the included information corresponds to same as transmitted by the Source MgNB to the Target MgNB (e.g., the bitmap). Correspondingly, the UE is informed that the Target MeNB has been informed about the uplink packet duplication status and can thus continue to use packet duplication when communicating with the Target MgNB for those uplink radio bearers as before.

As further shown in the implementation according to FIG. 14, the UE completes the handover procedure by transmitting a message indicating the completion of the handover procedure (here the RRC connection reconfiguration complete message) to the Target MgNB, wherein this message indicating the completion of the handover procedure can be already transmitted to the Target MgNB using the uplink packet duplication (exemplary assuming that packet duplication is activated for said uplink radio bearer, typically SRB1, used for the transmission of said message).

Generally, as one advantage of the implementation as illustrated in FIG. 14, wherein the UE packet duplication status is already transmitted during the handover, compared to same of FIG. 12 is that the latency between disabling uplink duplication before the handover and re-activating the uplink duplication after the handover is significantly reduced.

In addition, as shown in FIG. 14 as well as described above, (re)activation of the uplink duplication with the new Target MgNB is performed during the handover procedure and can thus be used directly during and after the handover procedure. Hence, the UE performs uplink duplication immediately after the handover procedure being completed. The RRC messages and uplink data are sent by the UE already in packet duplication mode.

According to one further exemplary implementation, the Target MgNB may, upon receipt of the handover request together with the packet duplication status, decide to change uplink packet duplication for radio bearers reported by the packet duplication status so as to establish radio bearers with an duplication status that differs from the status as informed and as previously established between the UE and the Source MgNB. In order to allow for deciding about such changes by the Target MgNB, the Target MgNB analyzes, according to an exemplary implementation, a measurement report received from the UE, wherein such measurement report reflects measurements performed by the UE for a radio link between the UE and the Target MgNB.

Figure 15:
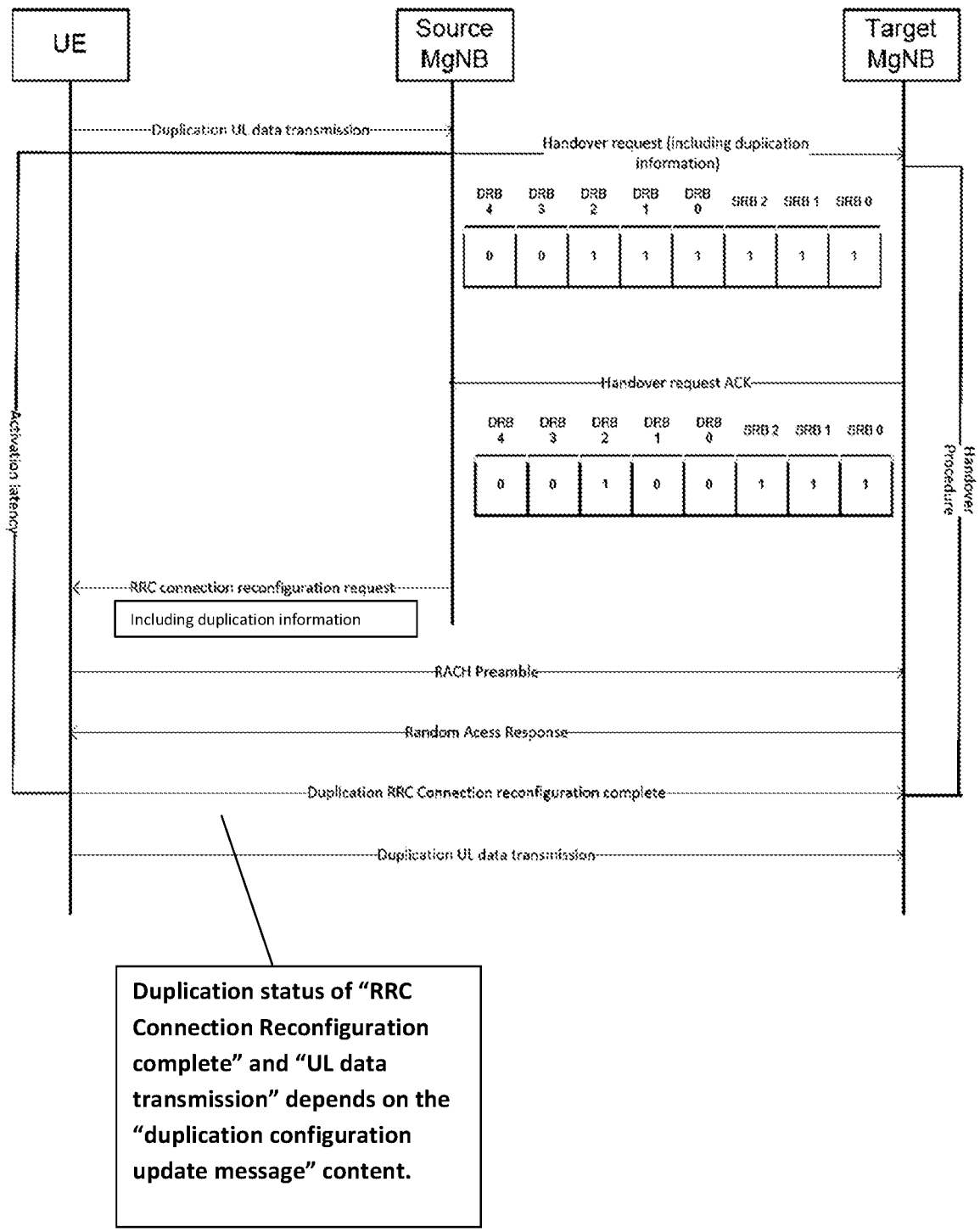
FIG. 15 illustrates a signaling diagram according to an improved implementation, where the Target MgNB modifies a received UE packet duplication status.

This further exemplary implementation is illustrated in FIG. 15. Upon receipt of the UE packet duplication status, the Target MgNB determines for each uplink radio bearer as to whether the received UE packet duplication status shall be modified. In the illustrated example according to FIG. 15, it is for instance shown, that the Target MgNB decides updating/modifying the uplink packet duplication for radio bearers DRB #0 and DRB #1 (as indicated in the received UE packet duplication status) to deactivate same after the handover. According to the exemplary implementation, such determination as to whether radio bearer are to be modified is based on measurement results performed by the UE for a radio link between the UE and the Target MgNB.

According to one exemplary implementation, such measurement results, which are performed by the UE and provided to the Source MgNB, are transmitted from the Source MgNB to the Target MgNB with the handover request message also exemplary used to carry the UE packet duplication status. Alternatively, the measurement results can be transmitted by the UE directly to the Target MgNB. According to another exemplary implementation, such measurement results, which are received from the UE, are transmitted from the UE to the Source MgNB, wherein the Source MgNB forwards the received measurement results to the Target MgNB with a handover request message. For instance, such measurement results may indicate to the Target MgNB that the respective link quality for radio bearers DRB #0 and #1 is better between the UE and the Target MgNB then it was before between the UE and the Source MgNB. In other words, for the respective radio bearer established between the UE and the Source MgNB, the target cell quality may be better than the serving cell quality.

Hence, the Target MgNB may decide that for these two radio bearers, as exemplarily shown in FIG. 15 for DRB #0 and #1, no uplink duplication is required in the target cell. Hence, the status for DRB #0 and #1 is deactivated, that is, the respective flags are updated from the originally received UE packet duplication status "1" to "0". For instance, the Target MgNB may decide that the target cell quality is good enough for the service eMBB so that the Target MgNB will disable uplink duplication for the respective radio bearers. According to a further exemplary implementation, the Target MgNB may also decide to activate several, i.e., to set active, several radio bearer, if for instance the target cell quality for the respective radio bearers is not good enough compared to the corresponding serving cell quality.

It is further exemplarily assumed that upon having been decided by the Target MgNB to modify at least one uplink radio bearer, it generates an updated UE packet duplication status and transmits the updated UE packet duplication status to the Source MgNB, as further illustrated in FIG. 15. Optionally, the Target MgNB transmits the updated UE packet duplication status with a handover request acknowledgment message to the Source MgNB.

According to a further exemplary implementation, the Target MgNB processes the updated UE packet duplication status so as to configure packet duplication of uplink radio bearers to be established between the UE and the Target MgNB after the handover. Optionally, the measurement results include measurements on the Reference Signal Received Quality, RSRQ, or Reference Signal Received Power, RSRP, or Signal-to-Noise, SNR, ratio.

As further illustrated in FIG. 15, the Source MgNB transmits the updated UE packet duplication status to the UE. Optionally, the updated UE packet duplication status is transmitted to the UE within a handover command message, such as, for instance in the RRC connection reconfiguration request message.

It is exemplarily assumed that the updated UE packet duplication status transmitted by the Source MgNB to the UE is in the same form of a bitmap for the original UE packet duplication status before modification by the Target MgNB, as described above in connection with FIG. 13.

The major advantage of the Target MgNB being capable of reacting on measurement results from the UE so as to be able to modify the UE packet duplication status lies in allowing to flexibly react on changed circumstances/cell conditions at the Target MgNB side, thereby improving application of the uplink packet duplication only where necessary and thus allowing to save—when possible—the additional resources spent on uplink packet duplication.

Figure 16:
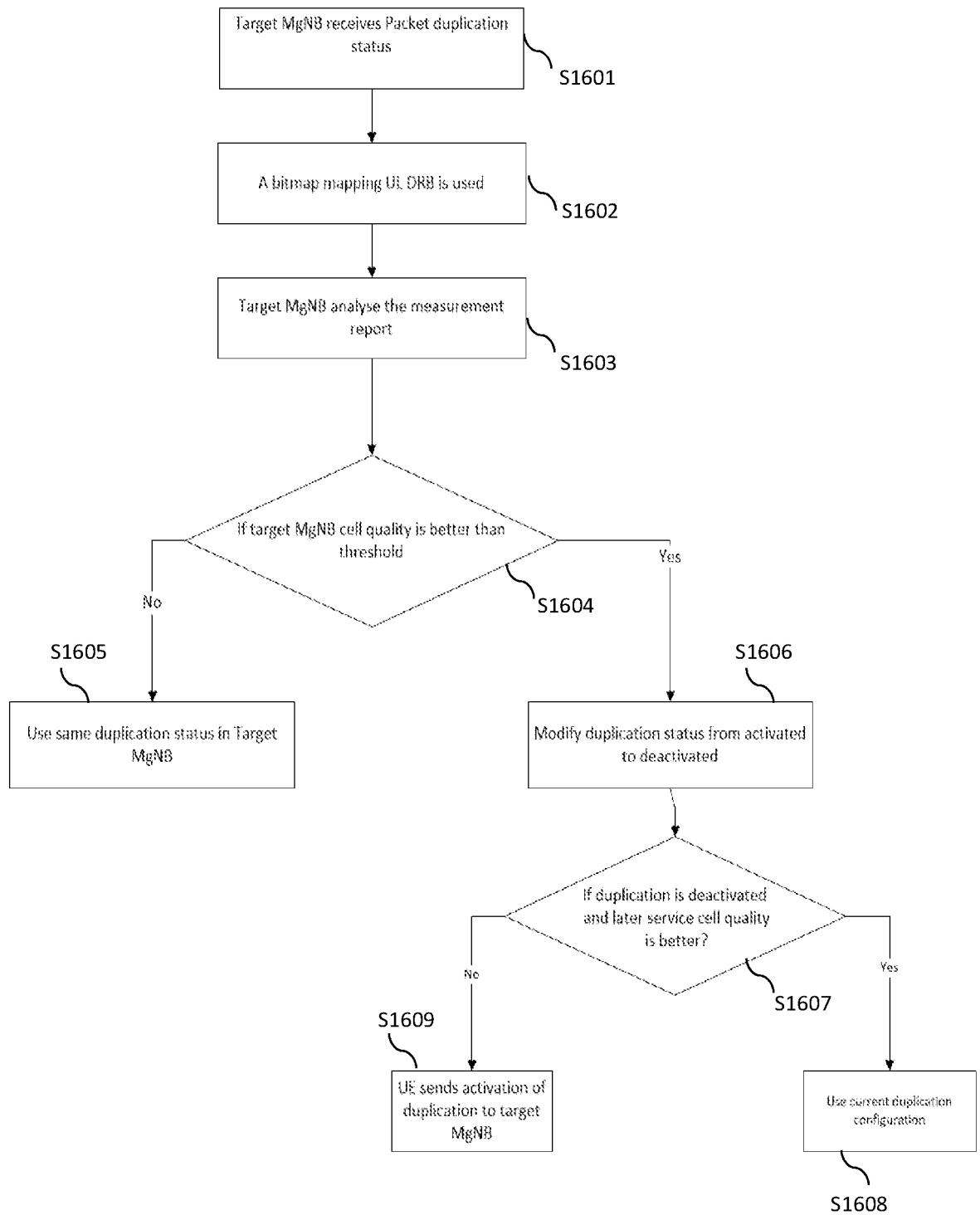
FIG. 16 illustrates a flow chart relating to the signaling diagram of FIG. 15.

FIG. 16 illustrates a general and simplified flow chart for an exemplary implementation of the signaling diagram of FIG. 15. In step S1601, the Target MgNB receives the UE packet duplication status. In step S1602, the Target MgNB analyzes the bitmap mapping according to the received UE packet duplication status. According to step S1603, the Target MgNB analyzes the measurement report received from the UE, either received directly from the UE or via the Source MgNB.

In step S1604, the Target MgNB decides as to whether the cell quality with respect to the concerned radio bearer indicated in the received packet duplication status is better than a predetermined threshold. In other words, it is decided in step S1604 by the Target MgNB as to whether the cell quality, as seen from the UE and as reflected by the UE in its measurement report, for the respective radio bearer is with regards to the target cell above a certain threshold.

If it is determined that the cell quality for the respective radio bearer in the target cell is not better or below a predetermined threshold, the Target MgNB proceeds to step S1605, wherein it is determined not to modify the UE packet duplication status. Hence, in this case, the Target MgNB uses the same duplication status it received beforehand by the UE packet duplication status.

Otherwise, if it is determined that the cell quality for the respective radio bearer in the target cell is better than a predetermined threshold, the Target MgNB proceeds to step S1606 and modifies the UE packet duplication status with respect to the concerned radio bearer from the activated state to the deactivated state. In other words, it changes the respective value within the field of the bitmap from the value "1" to "0" so as to deactivate packet duplication for the respective radio bearer for which the cell quality in the target cell is better than the threshold.

In this regard, if the cell quality is better than the threshold, the deactivation of a previously instructed activation of a radio bearer avoids unnecessary uplink packet duplication, since the related service which still meets the quality criteria, since the respective radio bearer has a better link quality in the target cell. Such deactivation of unnecessary uplink packet duplication then advantageously safes radio resources.

According to a further exemplary implementation, after having modified the UE packet duplication status and also upon completion of the handover, it is subsequently assumed that the UE may be able to decide in step S1607, if the respective duplication for the concerned radio bearer, which has been modified by the Target MgNB to be deactivated, is still deactivated and if the service cell quality for the respective radio bearer is still better than the threshold. This can be seen as a confirmation step of the decision taken by the Target MgNB.

If it is decided by the UE in step S1607 that the service cell quality is still better than the threshold, the Target MgNB may continue using the current UE packet duplication configuration (step S1608), that is, it continues using the UE packet duplication status for the established radio bearers as modified in step S1606.

Otherwise, if it is decided by the UE in step S1607 that the service cell quality is no longer better than the threshold, the UE sends an activation command of packet duplication to the Target MgNB for the respective radio bearer in step S1609. Optionally, with respect to the description of FIG. 16, it is to be noted that the several steps may also be performed for the case where the Target MgNB modifies a respective packet duplication status for a respective radio bearer from "deactivated" to "activated".

More specifically, in this case, it may be determined in an alternative step S1604 as to whether the cell quality with respect to the concerned radio bearer indicated in the received packet duplication status is not better than a predetermined threshold. If not, the Target MgNB would continue with the same UE packet duplication status as received in step S1605. Otherwise, if it is determined that the cell quality for the respective radio bearer is in the target cell not better than a predetermined threshold, the Target MgNB proceeds to an alternative step S1606 and modifies the UE packet duplication status with respect to the concerned radio bearer from the deactivated state to the activated state. In other words, it would change the respective value within the field of the bitmap from the value "0" to "1" so as to activate packet duplication for the respective radio bearer for which the cell quality in the target cell is not better than the threshold. The subsequent monitoring/decisions in steps S1607 to S1609 by the UE would be performed accordingly.

As an alternative or additional implementation, a UE packet duplication status message is directly transmitted from the UE to the Target MgNB, instead of having the Source MgNB transmit the UE packet duplication status message. According to this alternative implementation, the UE generates the UE packet duplication status, which includes information on the status of uplink packet duplication to be performed by the UE with the Target MgNB and at least one further gNB. As explained before, the Target MgNB is the target of a handover from the Source MgNB to be performed for the UE. The information on the status of uplink packet duplication may again be per uplink radio bearer, assuming that one or more uplink radio bearers are now established with the Source MgNB and will be established between the UE and the Target MgNB after the handover.

It is exemplarily assumed that when generating the UE packet duplication status, the UE determines the status of uplink packet duplication per uplink radio bearer based on results of measurements performed by the UE for a radio link to the Target MgNB. Optionally, the measurement results for the radio link to the Target MgNB are compared to measurement results performed by the UE for a radio link to the Source MgNB or may be compared to one or more thresholds to be able to decide on how to use uplink packet duplication in the target cell with the Target MgNB.

Many of the exemplary implementations explained in detail before can be equally assumed for the present implementation where the UE is responsible for transmitting the UE uplink packet duplication to the Target MgNB. For instance, it is further exemplarily assumed that the information on the status of uplink packet duplication is in the form of a bitmap including one bit per uplink radio bearer. Optionally, a status for each established radio bearer is to be reported or a status for a subset of the established radio bearers is to be reported. Optionally, the status of uplink packet duplication is simply either activate or inactive per uplink radio bearer. Optionally, an uplink radio bearer in this context is a signaling uplink radio bearer or a data uplink radio bearer. Optionally, the bitmap has a fixed size of one or more octets. Optionally, the UE packet duplication status is transmitted as a Medium Access Control, MAC, Control Element or a Packet Data Convergence Protocol, PDCP, Control, Packet Data Unit, PDU.

FIG. 17A and FIG. 17B illustrate the content of such a UE packet duplication status in an alternative format as the format discussed above in connection with FIGS. 13A and 13B. According to the exemplary implementation, the message format as shown in FIG. 17A relates to a MAC CE format for activating and deactivating packet duplication configuration, wherein a MAC CE is used for the bitmap that comprises "activated/deactivated flags" for the respective established radio bearers.

As shown in FIG. 17A, the content of a UE packet duplication status to be transmitted in the MAC CE format as exemplarily illustrated comprises information related to a combination of DRB duplication as well as SRB duplication, i.e., the bit fields are used for transmitting information on both, DRB duplication status as well as SRB duplication status together within one bitmap and the LCID field comprising a corresponding LCID value identifying the MAC CE as containing the UE packet duplication status. In the exemplary illustration, DRB #0 to DRB #4 are indicated in the bitmap, wherein uplink packet duplication for DRB #0 to DRB #2 is activated and uplink packet duplication for DRB #3 and DRB #4 is deactivated, and where uplink packet duplication for SRB #0 to SRB #2 is also indicated in the bitmap, with uplink packet duplication for all of these SRBs being activated.

As further shown in the upper part of FIG. 17B and in conformance with the exemplary implementation explained above with reference to FIG. 13B, separate MAC CEs can be used to transmit the UE packet duplication status for data radio bearers and signaling radio bearer separately. For instance, the content of a UE packet duplication status to be transmitted in the MAC CE format as exemplarily illustrated comprises information related to DRB duplication only, i.e., the bit fields are exclusively used for transmitting information on DRB duplication status only within one bitmap and the LCID field. In the exemplary illustration, DRB #0 to DRB #7 can be indicated in the bitmap, where uplink packet duplication for DRB #0 to DRB #2 is activated and where uplink packet duplication for DRB #3 to DRB #7 is deactivated.

As further shown in the lower part of FIG. 17B, the content of a UE packet duplication status to be transmitted in the MAC CE format as exemplarily illustrated comprises information related to SRB duplication only, i.e., the bit fields are exclusively used for transmitting information on SRB duplication status only within one bitmap and the LCID field. In the example, the LCID field comprises a corresponding LCID value identifying the MAC CE as containing the UE packet duplication status for data radio bearers. In the exemplary illustration, SRB #0 to SRB #2 can be indicated in the bitmap, where uplink packet duplication for SRB #0 to DRB #2 is activated. According to this exemplary illustration, the remaining bit fields are not assigned to any radio bearer and are reserved, indicated by "R" in the figure.

As a further alternative implementation, a UE packet duplication status transmitted from the UE to the Target MgNB can also be carried by another alternative message format, as illustrated in FIG. 18A and FIG. 18B.

According to the alternative implementation, the message format as shown in FIG. 18A relates to a PDCP Control PDU format for carrying the UE uplink packet duplication status (i.e., activating and deactivating uplink packet duplication). The format of a PDCP control PDU as exemplarily described in the background section in connection with FIG. 4 can be used in said respect. Correspondingly, the PDCP control PDU may include a D/C flag in the first octet ("Oct 1" in FIG. 18A). If such D/C flag has the value "0", it is thereby indicated that the PDU relates to a control PDU. If such D/C flag has the value "1", it is thereby indicated that the PDU relates to a data PDU.

Furthermore, the field of second to fourth bits of the first octet may relate to the specific "PDU type". For example, in current 3GPP specifications bit values 100 to 111 of the PDU type field are reserved and currently not used for indicating the specific PDU type. Any of these bit values can be used for the purpose of implementing the UE uplink packet duplication status message. According to one example, the PDU type indicated by the bit value 100 means that the PDCP Control PDU indicates UE packet uplink duplication for both DRB and SRB.

Further to the example illustrated in FIG. 18A, the remaining for bits of the first octet may reflect the activated or deactivated status of the SRB and/or DRB. Further to the example illustrated in FIG. 18A, the second octet ("Oct 2") reflects the activated or deactivated status of the DRB and/or SRB. According to a further alternative implementation of this example, if the status of further SRB and/or DRB may be transmitted in the PDCP control PDU, additional octets may be used.

According to a further alternative implementation, the message formats as shown in FIG. 18B relate to PDCP control PDU formats for activating and deactivating packet duplication configuration, wherein a PDCP control PDU is used for transmitting the activated/deactivated state of DRB and SRB separately.

According to this alternative implementation, the PDCP control PDU may be comprised of one octet of bits. As one option, the first bit field (with the bit field length of 1 bit) relates to the D/C flag, followed by the second to fourth bits which relate to the specific "PDU type". Thereby, the number of bit fields used for the PDU type is variable. For example, bit value 102 may indicate that the PDCP control PDU relates to a specific PDU type for transmitting the activated or deactivated UL packet duplication status of the DRB only, which is reflected in the lower part of FIG. 18B. Further to this example, the last four bits of the PDCP control PDU may be used for indicating the activated/deactivated status of the DRBs.

According to another example, bit value 101 for the PDU type may indicate that the PDCP control PDU relates to a specific PDU type for transmitting the activated or deactivated UL packet duplication status of the SRB only, which is reflected in the upper part of FIG. 18B. Further to this example, the last four bits of the PDCP control PDU may be used for indicating the activated/deactivated status of the SRBs, optionally together with a reserved bit field "R".

Figure 19:
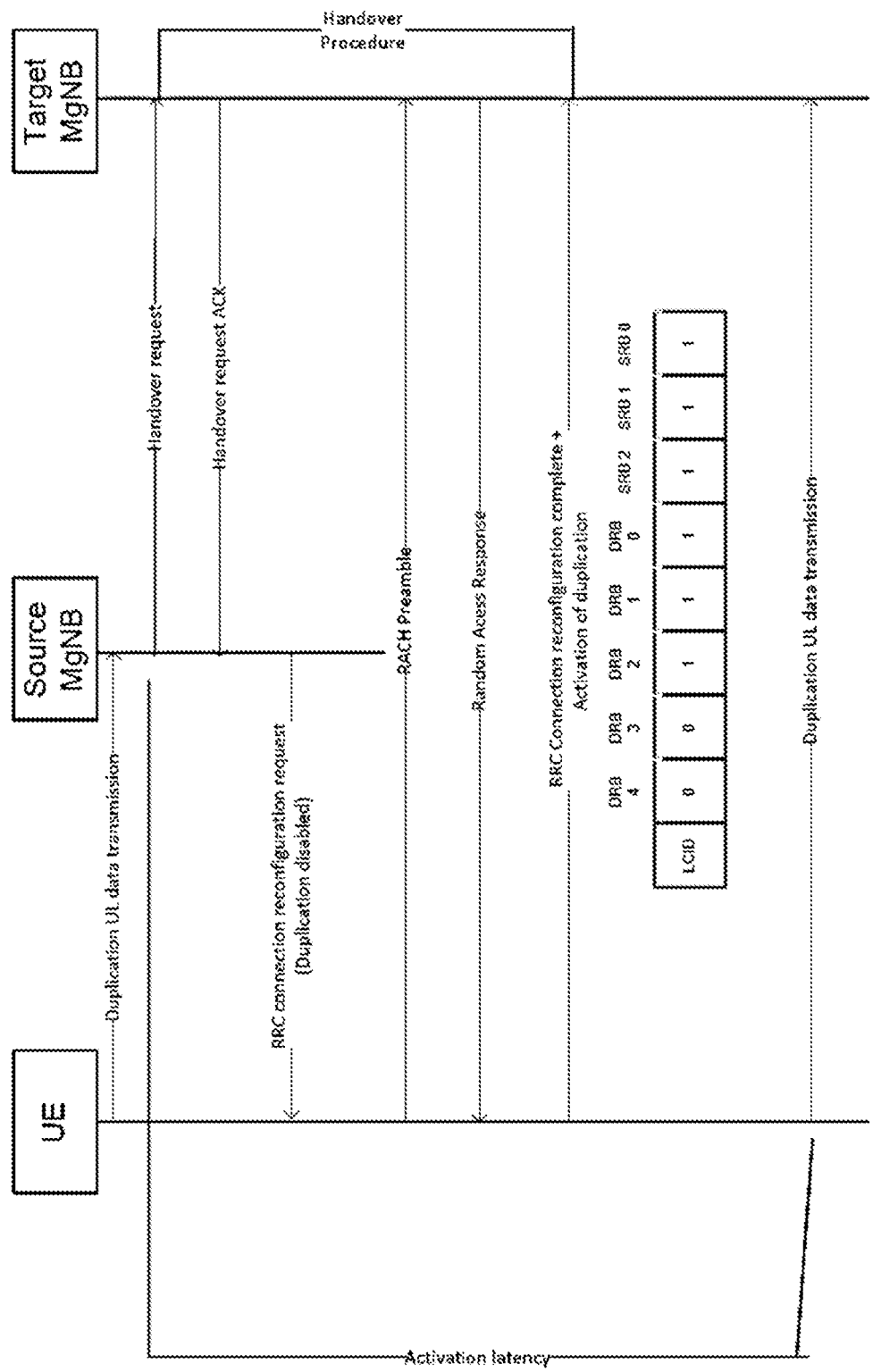
FIG. 19 illustrates a signaling diagram according to an alternative implementation, where the UE packet duplication status is transmitted by the UE and received by the Target MgNB as part of the handover procedure, using a 4-step RACH procedure.

FIG. 19 illustrates a signaling diagram according to the alternative implementation, where the UE packet duplication status is transmitted directly from the UE to the Target MgNB as part of a handover procedure. According to one exemplary implementation, the UE packet duplication status is transmitted to the Target MgNB as part of a RACH procedure performed by the UE with the Target MgNB. It is exemplarily assumed that the RACH procedure consists of four steps, and that the UE packet duplication status is transmitted together with any uplink signaling message of the RACH procedure.

As shown in FIG. 19, the UE transmits, after the reception of the RRC connection reconfiguration request which informs the UE about the new Target MgNB, a RACH preamble to the Target MgNB, wherein the RACH preamble corresponds to message 1 of the RACH Procedure as described above in connection with FIGS. 9 and 10. Subsequently, the UE receives a message from the Target MgNB which is the Random Access Response message. Thereafter, the UE transmits to the Target MgNB, as a third message an RRC Connection Reconfiguration Complete message together with the UE packet duplication status. Hence, the third message can be seen as message 3 described above in connection with FIGS. 9 and 10, however in a modified form, since the Activation of Duplication message is transmitted together with the RRC Connection Reconfiguration Complete message being the UE packet duplication status. According to an exemplary implementation, the content of the UE packet duplication status has the format as discussed above in connection with FIG. 17A or 17B. According to a further alternative exemplary implementation, the content of the UE packet duplication status has the format as discussed above in connection with FIG. 18A or 18B. After having finished the RACH procedure, the UE performs uplink packet duplication with the Target MgNB.

Figure 20:
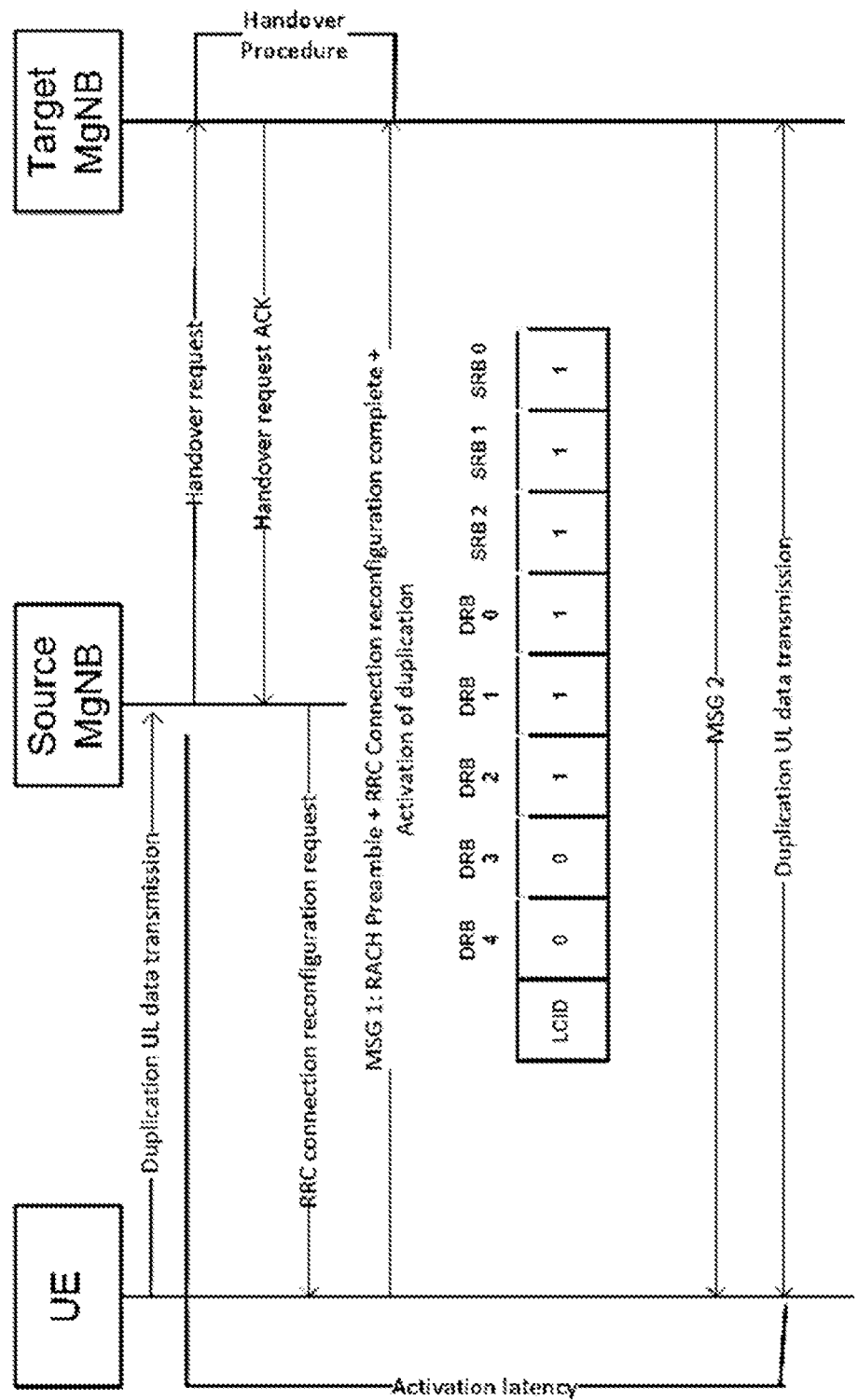
FIG. 20 illustrates a signaling diagram according to an alternative implementation, where the UE packet duplication status is transmitted by the UE and received by the Target MgNB as part of the handover procedure, using a 2-step RACH procedure.

FIG. 20 illustrates another signaling diagram according to the alternative implementation, where the UE packet duplication status is transmitted directly from the UE to the Target MgNB as part of the handover procedure. According to a further exemplary implementation, the UE packet duplication status is transmitted to the Target MgNB as part of a RACH procedure performed by the UE with the Target MgNB. It is exemplarily assumed that the RACH procedure consists of two steps, and that the UE packet duplication status is transmitted together with a RACH preamble and a handover complete message of the RACH procedure.

As explained above in connection with FIGS. 9 and 10, the 2-step RACH procedure uses as the first message a combined message 1 and message 3 of the 4-step RACH procedure. According to this further exemplary implementation, as shown in FIG. 20, the UE transmits to the Target MgNB the UE packet duplication status together with this combined message (i.e., the combination of messages 1 and 3). Hence, the first step of this 2-step RACH procedure is the transmission of the RACH preamble, the RRC Connection Reconfiguration Complete message as well as the Activation of Duplication message. The radio resources available to the UE for transmitting this first message of the 2-step RACH procedure are made known in the radio cell using the system information broadcast. According to an exemplary implementation, the content of the UE packet duplication status has the format as discussed above in connection with FIG. 17A or 17B. According to a further alternative exemplary implementation, the content of the UE packet duplication status has the format as discussed above in connection with FIG. 18A or 18B.

In reaction to this message from the UE having included the UE packet duplication status, the Target MgNB responds with a message that relates to the second step of the 2-step RACH procedure, which corresponds to a combination of messages 2 and 4 of the 4-step RACH Procedure. After having finished the RACH procedure, the UE performs uplink packet duplication with the Target MgNB.

Figure 21:
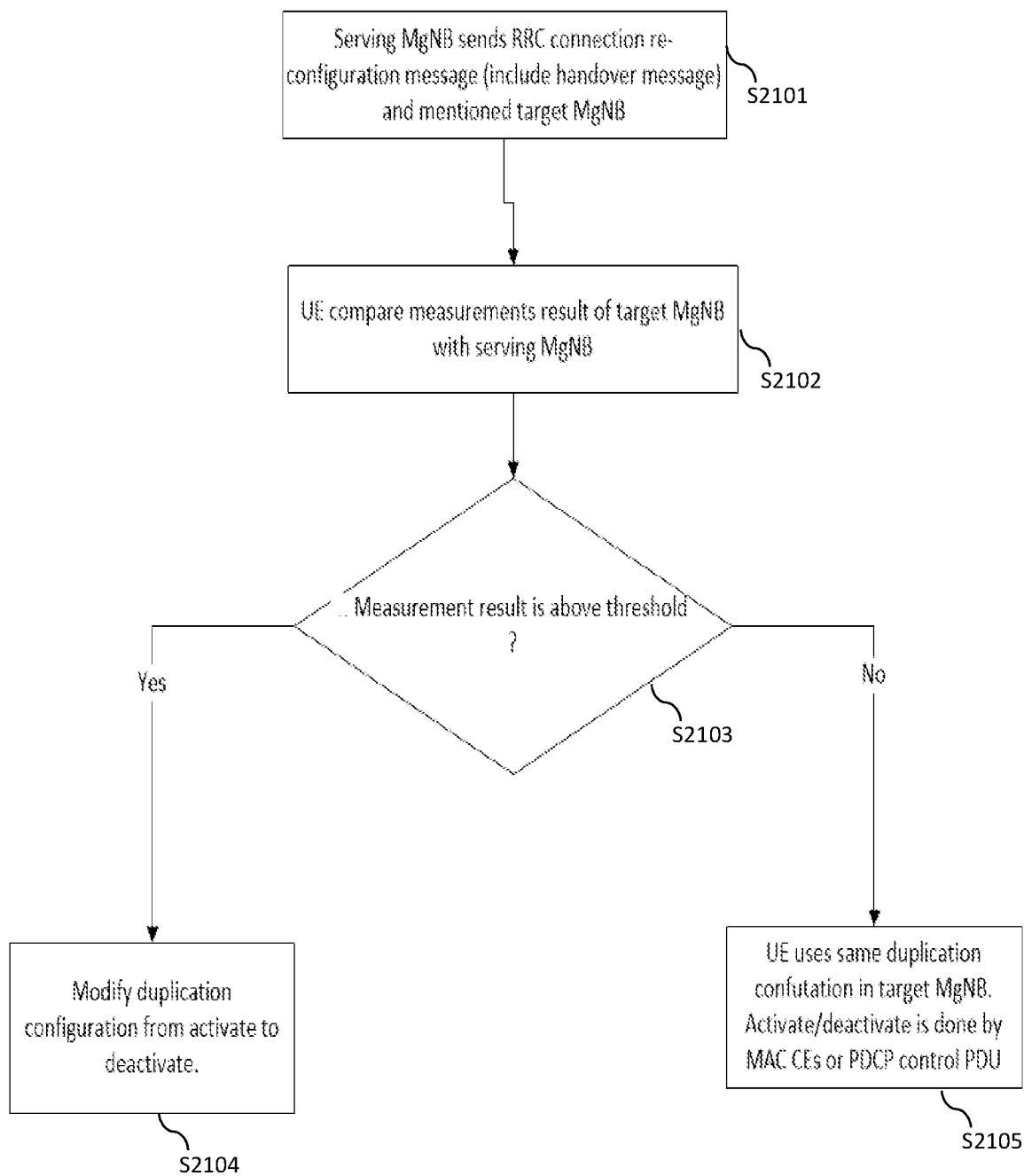
FIG. 21 illustrates a flow chart where a UE packet duplication status message is directly transmitted from the UE to the Target MgNB.

FIG. 21 illustrates an exemplary and simplified flow chart relating to one exemplary implementation of the alternative where a UE packet duplication status message is directly transmitted from the UE to the Target MgNB.

In step S2101, the Source MgNB (serving MgNB) sends to the UE an RRC Connection Reconfiguration message (which includes the handover message) together with information about the Target MgNB to be used by the UE after the handover.

Subsequently, the UE uses, in step S2102, its own measurement results with respect to the Target MgNB to determine whether to modify or not the uplink duplication status for one or more radio bearers as currently used with the Source MgNB. In one example implementation, the UE compares the measurement results for the Target MgNB with the measurement results for the Source MgNB (serving MgNB). Alternatively, the UE may compare the measurement results with a particular threshold (e.g., cell quality parameter, such as RSRP, RSRQ, SNR) in order to be able to determine whether or not to continue using the same uplink packet duplication status used before for the communication with the Source MgNB.

In step S2103, depending on the implementation of the comparison in step S2102, the UE may then determines for each radio bearer as to whether the target cell measurement result is above the certain threshold or above the source cell measurement result. If it is determined that the respective measurement result in connection with the Target MgNB is above the predetermined threshold, it is, for example, decided that the link quality for the respective radio bearer to the Target MgNB is good enough. If it is determined that the target cell measurement result is better than the source cell measurements, then the link quality in the target cell is better and the UE may not need packet duplication.

In either case, it then is proceeded with step S2104, where the UE packet duplication status to be transmitted to the Target MgNB is modified so as to change duplication configuration from activated to deactivated for the respective radio bearer in the UE packet duplication status.

If it is, however, determined that the measurement result in connection with the Target MgNB is not above the predetermined threshold for the respective radio bearer, it is, for example, decided that the link quality for the respective radio bearer to the Target MgNB is not good enough. If it is determined that the target cell measurement result is not better than the source cell measurements, then the link quality in the target cell is not better and the UE may still need packet duplication. It then is proceeded with step S2105, where the UE uses the same uplink duplication configuration with the Target MgNB as done before with the Source MgNB.

In any case, the UE packet duplication status (whether it is modified or not compared to the one used together with the Source MgNB) is transmitted to the Target MgNB with correspondingly activated or deactivated radio bearer indications using the MAC CE or PDCP control PDU as explained before.

It is to be noted that one advantage of the alternative implementation as described above in connection with FIGS. 17 to 21, where the UE packet duplication status message is directly transmitted from the UE to the Target MgNB, lies in giving the UE the specific flexibility of deciding as to whether duplication for a respective radio bearer is to be activated or deactivated in the UE packet duplication status to be transmitted to the Target MgNB.

As a further advantage of this alternative implementation, no inter-gNB coordination is required, i.e., no new signaling format is required via the inter-gNB interface.

Also, this alternative implementation as described above in connection with FIGS. 17 to 21 advantageously achieves that the latency for using duplication for the respective radio bearers after handover is reduced compared to the implementation as described above in connection with FIG. 12.

Further Aspects

According to a first aspect, a source base station is provided. The source base station comprises a processing circuitry, which when in operation, generates a user equipment packet duplication status, which includes information on the status of uplink packet duplication performed by a user equipment with the source base station and at least one further base station. The information on the status of uplink packet duplication is per uplink radio bearer, one or more uplink radio bearers being established between the user equipment and the source base station. The source base station further comprises a transmitter, which when in operation, transmits the user equipment packet duplication status to a target base station which is the target of a handover from the source base station performed for the user equipment.

According to a second aspect provided in addition to the first aspect, the user equipment packet duplication status is transmitted by the transmitter during a handover procedure.

According to a third aspect provided in addition to the second aspect, the user equipment packet duplication status is transmitted by the transmitter in a handover request message, transmitted to the target base station to initiate the handover performed for the user equipment.

According to a fourth aspect provided in addition to the second or third aspect, the source base station further comprises a receiver which, when in operation, receives from the target base station an acknowledgment for the transmitted user equipment packet duplication status, optionally within a handover request acknowledgment message. The transmitter, when in operation, transmits an acknowledgment to the user equipment to acknowledge the packet duplication status of the target base station, optionally within a handover command message, optionally wherein the acknowledgment includes the information on the status of uplink packet duplication performed by the user equipment.

According to a fifth aspect provided in addition to any of the first to fourth aspects, wherein the information on the status of uplink packet duplication of the user equipment is in the form of a bitmap including one bit per radio bearer. Optionally, a status for each established radio bearer is to be reported. Optionally, a status for a subset of the established radio bearer is to be reported. Optionally, the status of uplink packet duplication is either activated or deactivated per uplink radio bearer. Optionally, an uplink radio bearer is a signaling uplink radio bearer or a data uplink radio bearer. Optionally, the bitmap has a fixed size of one or more octets.

According to a sixth aspect provided in addition to any of the first to fifth aspects, wherein the user equipment performs uplink packet duplication by transmitting the same data packets to the source base station and the at least one further base station. The source base station participates as the receiving side of the uplink packet duplication performed by the user equipment by using both data packets received from the user equipment and from the at least one further base station to generate a single data packet to be forwarded to upper layers of the source base station.

According to a seventh aspect provided in addition to any of the first to sixth aspects, wherein the source base station is either a source master base station or a source secondary base station.

According to a eighth aspect provided in addition to any of the first to seventh aspects, the source base station further comprises a receiver, which, when in operation, receives an updated user equipment packet duplication status from the target base station, the target base station having modified the received user equipment packet duplication status for at least one uplink radio bearer so as to generate the updated user equipment packet duplication status, optionally wherein the updated user equipment packet duplication status is received within a handover request acknowledgment message. The transmitter, when in operation, transmits the updated user equipment packet duplication status to the user equipment, optionally wherein the updated user equipment packet duplication status is transmitted to the user equipment within a handover command message.

According to a ninth aspect provided in addition to the eighth aspect, wherein the updated user equipment packet duplication status is in the form of a bitmap including one bit per uplink radio bearer. Optionally, an updated status for each established radio bearer is to be reported. Optionally, an updated status for a subset of the established radio bearer is to be reported. Optionally, the updated status of uplink packet duplication is either activated or deactivated per uplink radio bearer. Optionally, an uplink radio bearer is a signaling uplink radio bearer or a data uplink radio bearer. Optionally, the bitmap has a fixed size of one or more octets.

According to a tenth aspect provided in addition to the eighth or ninth aspect, wherein the transmitter when in operation, transmits to the target base station results of measurements performed by the user equipment for a radio link between the user equipment and the target base station, optionally wherein the measurement results are transmitted with a handover request message, optionally, wherein the measurement results are received from the user equipment.

According to an eleventh aspect, a target base station is provided that comprises a receiver, which when in operation, receives a user equipment packet duplication status, which includes information on the status of uplink packet duplication performed by a user equipment with a source base station and at least one further base station, the target base station being the target of a handover from the source base station performed for the user equipment. The information on the status of uplink packet duplication is per uplink radio bearer, one or more uplink radio bearers being established between the user equipment and the source base station. The target base station further comprises a processing circuitry, which when in operation, processes the received user equipment packet duplication status to configure packet duplication of uplink radio bearers to be established between the user equipment and the target base station after the handover.

According to a twelfth aspect provided in addition to the eleventh aspect, wherein the user equipment packet duplication status is received by the receiver during a handover procedure.

According to a thirteenth aspect provided in addition to the twelfth aspect, wherein the user equipment packet duplication status is received by the receiver in a handover request message from the source base station to initiate the handover performed for the user equipment.

According to a fourteenth aspect provided in addition to any of the eleventh to thirteenth aspects, wherein the target base station further comprises a transmitter, when in operation, transmits to the source base station an acknowledgment for the received user equipment packet duplication status, optionally within a handover request acknowledgment message.

According to a fifteenth aspect provided in addition to any of the eleventh to fourteenth aspects, wherein the processing circuitry, when in operation, determines per uplink radio bearer whether to modify the received user equipment packet duplication status, optionally wherein the determination is based on results of measurements received from the source base station or from the user equipment and performed by the user equipment for a radio link between the user equipment and the target base station. When determining to modify the received user equipment packet duplication status for at least one uplink radio bearer, the processing circuitry, when in operation, generates an updated user equipment packet duplication status, and the transmitter, when in operation, transmits the updated user equipment packet duplication status to the source base station, optionally with a handover request acknowledgment message, optionally wherein the processing circuitry, when in operation, processes the updated user equipment packet duplication status to configure packet duplication of uplink radio bearers to be established between the user equipment and the target base station after the handover.

According to a sixteenth aspect provided in addition to any of the eleventh to fifteenth aspects, wherein the measurement results are received from the source base station with a handover request message, optionally wherein the measurement results include measurements on the Reference Signal Received Quality, RSRQ, or Reference Signal Received Power, RSRP, or Signal-to-Noise, SNR, ratio.

According to a seventeenth aspect, a user equipment is provided that comprises a processing circuitry, which when in operation, generates a user equipment packet duplication status, which includes information on the status of uplink packet duplication to be performed by the user equipment with a target base station and at least one further base station, the target base station being the target of a handover from a source base station to be performed for the user equipment. The information on the status of uplink packet duplication is per uplink radio bearer, one or more uplink radio bearers being established between the user equipment and the target base station after the handover. The user equipment further comprises a transmitter, which when in operation, transmits the generated user equipment packet duplication status to the target base station.

According to an eighteenth aspect provided in addition to the seventeenth aspect, wherein the processing circuitry, when generating the user equipment packet duplication status, determines the status of uplink packet duplication per uplink radio bearer based on results of measurements performed by the user equipment for a radio link to the target base station. Optionally, the measurement results for the radio link to the target base station are compared to measurement results performed by the user equipment for a radio link to the source base station.

According to a nineteenth aspect provided in addition to the seventeenth or eighteenth aspect, wherein the information on the status of uplink packet duplication is in the form of a bitmap including one bit per uplink radio bearer, optionally, wherein a status for each established radio bearer is to be reported, optionally wherein a status for a subset of the established radio bearer is to be reported, optionally, wherein the status of uplink packet duplication is either activated or deactivated per uplink radio bearer, optionally, wherein an uplink radio bearer is a signaling uplink radio bearer or a data uplink radio bearer, optionally, wherein the bitmap has a fixed size of one or more octets, optionally, wherein the user equipment packet duplication status is transmitted as a Medium Access Control, MAC, Control Element or a Packet Data Convergence Protocol, PDCP, Control, Packet Data Unit, PDU.

According to a twentieth aspect provided in addition to any of the seventeenth to nineteenth aspect, the user equipment packet duplication status is transmitted to the target base station as part of a Random Access Channel, RACH, procedure performed by the user equipment with the target base station. Optionally, the RACH procedure consists of four steps, and the user equipment packet duplication status is transmitted together with any signaling message of the RACH procedure. Optionally, the RACH procedure consists of two steps, and the user equipment packet duplication status is transmitted together with a RACH preamble and a handover complete message of the RACH procedure.

According to a twenty-first aspect, there is provided a method for operating a source base station, wherein the method comprises generating a user equipment packet duplication status, which includes information on the status of uplink packet duplication performed by a user equipment with the source base station and at least one further base station. The information on the status of uplink packet duplication is per uplink radio bearer, one or more uplink radio bearers being established between the user equipment and the source base station. The method further comprises transmitting the user equipment packet duplication status to a target base station which is the target of a handover from the source base station performed for the user equipment.

According to a twenty-second aspect, there is provided a method for operating a target base station, wherein the method comprises receiving a user equipment packet duplication status, which includes information on the status of uplink packet duplication performed by a user equipment with a source base station and at least one further base station, the target base station being the target of a handover from the source base station performed for the user equipment. The information on the status of uplink packet duplication is per uplink radio bearer, one or more uplink radio bearers being established between the user equipment and the source base station. The method further comprises processing the received user equipment packet duplication status to configure packet duplication of uplink radio bearers to be established between the user equipment and the target base station after the handover.

According to a twenty-third aspect, there is provided a method for operating a user equipment, wherein the method comprises generating a user equipment packet duplication status, which includes information on the status of uplink packet duplication to be performed by the user equipment with a target base station and at least one further base station, the target base station being the target of a handover from a source base station to be performed for the user equipment. The information on the status of uplink packet duplication is per uplink radio bearer, one or more uplink radio bearers being established between the user equipment and the target base station after the handover. The method further comprises transmitting the generated user equipment packet duplication status to the target base station.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling a user equipment, the integrated circuit comprising:
   processing circuitry, which, in operation, generates a user equipment packet duplication status, which includes information on a status of uplink packet duplication to be performed by the user equipment with at least one base station,
   wherein the information on the status of uplink packet duplication is per uplink radio bearer, one or more uplink radio bearers being established between the user equipment and the at least one base station, and
   transmitting circuitry, which, in operation, transmits the generated user equipment packet duplication status to the at least one base station,
   wherein,
   the processing circuitry, when generating the user equipment packet duplication status, determines the status of uplink packet duplication per uplink radio bearer based on configuration information received from the at least one base station,
   the information on the status of uplink packet duplication is in a form of a bitmap including one bit per uplink radio bearer, and
   the status of uplink packet duplication is either activated or deactivated per uplink radio bearer.

2. The integrated circuit according to claim 1, wherein the uplink radio bearer is a data uplink radio bearer.

3. The integrated circuit according to claim 1, wherein the bitmap has a fixed size of one or more octets.

4. The integrated circuit according to claim 1, wherein the user equipment packet duplication status is transmitted as a Medium Access Control (MAC) Control Element.

5. The integrated circuit according to claim 4, wherein the user equipment packet duplication status is dynamically updated by means of the MAC Control Element.

6. The integrated circuit according to claim 4, wherein, in the MAC Control Element, "1" indicates the status of uplink packet duplication being activated and "0" indicates the status of uplink packet duplication being deactivated.

7. The integrated circuit according to claim 1, wherein the user equipment packet duplication status is transmitted to the at least one base station as part of a Random Access Channel (RACH) procedure performed by the user equipment with the at least one base station,
   wherein,
   in case the RACH procedure consists of four steps, the user equipment packet duplication status is transmitted together with any signaling message of the RACH procedure, and
   in case the RACH procedure consists of two steps, the user equipment packet duplication status is transmitted together with a RACH preamble and a handover complete message of the RACH procedure.

8. The integrated circuit according to claim 1, wherein the configuration information is included in a handover command message received from the at least one base station.

9. A user equipment, comprising:
receiving circuitry, which, in operation, receives a user equipment packet duplication status from at least one base station, and
processing circuitry, which, in operation, obtains the user equipment packet duplication status, which includes information on a status of uplink packet duplication to be performed by the user equipment with at least one base station,
wherein the information on the status of uplink packet duplication is per uplink radio bearer, one or more uplink radio bearers being established between the user equipment and the at least one base station, and
wherein,
the processing circuitry, when obtaining the user equipment packet duplication status, determines the status of uplink packet duplication per uplink radio bearer based on configuration information received from the at least one base station, the configuration information initiating the duplication at the user equipment and the at least one base station,
the information on the status of uplink packet duplication is in a form of a bitmap including one bit per uplink radio bearer, and
the status of uplink packet duplication is either activated or deactivated per uplink radio bearer.

10. The user equipment according to claim 9,
wherein the uplink radio bearer is a data uplink radio bearer.

11. The user equipment according to claim 10,
wherein the bitmap has a fixed size of one or more octets.

12. The user equipment according to claim 11,
wherein the user equipment packet duplication status is transmitted as a Medium Access Control (MAC) Control Element.

13. The user equipment according to claim 12,
wherein the user equipment packet duplication status is dynamically updated by means of the MAC Control Element.

14. The user equipment according to claim 12,
wherein, in the MAC Control Element, "1" indicates the status of uplink packet duplication being activated and "0" indicates the status of uplink packet duplication being deactivated.

15. A method performed by a user equipment, comprising:
receiving a user equipment packet duplication status from at least one base station, and
obtaining the user equipment packet duplication status, which includes information on a status of uplink packet duplication to be performed by the user equipment with at least one base station,
wherein the information on the status of uplink packet duplication is per uplink radio bearer, one or more uplink radio bearers being established between the user equipment and the at least one base station, and
wherein,
when obtaining the user equipment packet duplication status, determines the status of uplink packet duplication per uplink radio bearer based on configuration information received from the at least one base station, the configuration information initiating the duplication at the user equipment and the at least one base station,
the information on the status of uplink packet duplication is in a form of a bitmap including one bit per uplink radio bearer, and
the status of uplink packet duplication is either activated or deactivated per uplink radio bearer.

* * * * *